US011562394B2

(12) United States Patent
Alla et al.

(10) Patent No.: US 11,562,394 B2
(45) Date of Patent: Jan. 24, 2023

(54) METHODS AND APPARATUS TO ASSOCIATE TRANSACTIONS WITH MEDIA IMPRESSIONS

(71) Applicant: The Nielsen Company (US), LLC, New York, NY (US)

(72) Inventors: Madhusudhan Reddy Alla, Allen, TX (US); Jillian Renee Rollinger, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/943,905

(22) Filed: Jul. 30, 2020

(65) Prior Publication Data
US 2021/0012373 A1    Jan. 14, 2021

Related U.S. Application Data

(63) Continuation of application No. 14/473,654, filed on Aug. 29, 2014, now abandoned.

(51) Int. Cl.
G06Q 30/00         (2012.01)
G06Q 30/02         (2012.01)
G06F 16/245        (2019.01)

(52) U.S. Cl.
CPC ....... G06Q 30/0246 (2013.01); G06F 16/245 (2019.01); G06Q 30/0201 (2013.01);
(Continued)

(58) Field of Classification Search
CPC ........... G06Q 30/0246; G06Q 30/0201; G06Q 30/0271; G06Q 30/0259; G06Q 30/0242;
(Continued)

(56) References Cited

U.S. PATENT DOCUMENTS 3,540,003 A    11/1970 Murphy
3,818,458 A    6/1974 Deese
(Continued)

FOREIGN PATENT DOCUMENTS

AU    2013205736    5/2013
AU    2015230772    10/2015
(Continued)

OTHER PUBLICATIONS

Adam et al., "Privacy Preserving Integration of Health Care Data," AMIA 2007 Symposium Proceedings, 6 pages.
(Continued)

*Primary Examiner* — Raquel Alvarez
(74) *Attorney, Agent, or Firm* — Hanley, Flight and Zimmerman, LLC

(57) ABSTRACT

Methods and apparatus to associate transactions with media impressions are disclosed. An example method includes transmitting a request for commercial transaction information to a database proprietor, the request including an identifier corresponding to a media impression associated with media presented via a computing device; receiving the commercial transaction information in response to the request, the commercial transaction information comprising data associated with a commercial transaction conducted using an account accessed by the computing device; and associating the media impression with the commercial transaction.

19 Claims, 12 Drawing Sheets

(52) U.S. Cl.
CPC ..... *G06Q 30/0242* (2013.01); *G06Q 30/0251* (2013.01); *G06Q 30/0259* (2013.01); *G06Q 30/0261* (2013.01); *G06Q 30/0271* (2013.01)

(58) Field of Classification Search
CPC ............ G06Q 30/0261; G06Q 30/0251; G06F 16/245
See application file for complete search history.

(56) References Cited

U.S. PATENT DOCUMENTS

| | | |
|---|---|---|
| 3,906,450 A | 9/1975 | Prado |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,658,093 A | 4/1987 | Hellman |
| 4,672,572 A | 6/1987 | Alsberg |
| 4,685,056 A | 8/1987 | Bamsdale, Jr. et al. |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,977,594 A | 12/1990 | Shear |
| 5,023,907 A | 6/1991 | Johnson et al. |
| 5,086,386 A | 2/1992 | Islam |
| 5,182,770 A | 1/1993 | Medveczky et al. |
| 5,204,897 A | 4/1993 | Wyman |
| 5,233,642 A | 11/1993 | Renton |
| 5,283,734 A | 2/1994 | Von Kohorn |
| 5,287,408 A | 2/1994 | Samson |
| 5,355,484 A | 10/1994 | Record et al. |
| 5,343,239 A | 11/1994 | Lappington et al. |
| 5,374,951 A | 12/1994 | Welsh |
| 5,377,269 A | 12/1994 | Heptig et al. |
| 5,388,211 A | 2/1995 | Hombuckle |
| 5,406,269 A | 4/1995 | Baran |
| 5,410,598 A | 4/1995 | Shear |
| 5,440,738 A | 4/1995 | Bowman et al. |
| 5,444,642 A | 8/1995 | Montgomery et al. |
| 5,450,134 A | 9/1995 | Legate |
| 5,483,658 A | 1/1996 | Gmbe et al. |
| 5,497,479 A | 3/1996 | Hombuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,141,694 A | 8/2000 | Gardner |
| 6,138,155 A | 10/2000 | Davis et al. |
| 6,164,975 A | 12/2000 | Weingarden et al. |
| 6,223,215 B1 | 4/2001 | Hunt et al. |
| 6,247,050 B1 | 6/2001 | Tso et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,127,305 B1 | 10/2006 | Palmon |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dertinger et al. |
| 7,159,023 B2 | 1/2007 | Tufts |
| 7,181,412 B1 | 2/2007 | Fulgoni et al. |
| 7,257,546 B2 | 8/2007 | Ebrahimi et al. |
| 7,260,837 B2 | 8/2007 | Abraham et al. |
| 7,272,617 B1 | 9/2007 | Bayer et al. |
| 7,302,447 B2 | 11/2007 | Dertinger et al. |
| 7,323,991 B1 | 1/2008 | Eckbert et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,444,388 B1 | 10/2008 | Svendsen |
| 7,526,538 B2 | 4/2009 | Wilson |
| 7,546,370 B1 | 6/2009 | Acharya et al. |
| 7,590,568 B2 | 9/2009 | Blumenau |
| 7,593,576 B2 | 9/2009 | Meyer et al. |
| 7,600,014 B2 | 10/2009 | Russell et al. |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,242 B2 | 2/2011 | Chen |
| 7,882,054 B2 | 3/2011 | Levitan |
| 7,890,451 B2 | 3/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,032,626 B1 | 10/2011 | Russell et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,117,193 B2 | 3/2012 | Svendsen et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,151,291 B2 | 4/2012 | Ramaswamy |

(56) References Cited

U.S. PATENT DOCUMENTS

| | | |
|---|---|---|
| 8,180,112 B2 | 5/2012 | Kurtz et al. |
| 8,229,458 B2 | 7/2012 | Busch |
| 8,229,780 B2 | 7/2012 | Davidow et al. |
| 8,234,408 B2 | 7/2012 | Jungck |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,307,458 B2 | 11/2012 | Kasahara et al. |
| 8,370,489 B2 | 2/2013 | Mazumdar et al. |
| 8,387,084 B1 | 2/2013 | Klappert et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,514,907 B2 | 8/2013 | Wright et al. |
| 8,515,459 B2 | 8/2013 | Busch |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,626,084 B2 | 1/2014 | Chan et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,083,853 B2 | 7/2015 | Shkedi |
| 9,106,709 B2 | 8/2015 | Desilva et al. |
| 9,117,217 B2 | 8/2015 | Wilson et al. |
| 9,210,130 B2 | 12/2015 | Burbank et al. |
| 9,215,288 B2 | 12/2015 | Seth et al. |
| 9,218,612 B2 | 12/2015 | Mazumdar et al. |
| 9,237,138 B2 | 1/2016 | Bosworth et al. |
| 9,301,007 B2 | 3/2016 | Ramaswamy |
| 9,449,290 B1 * | 9/2016 | Cavanaugh .......... G06Q 20/322 |
| 9,519,914 B2 | 12/2016 | Splaine et al. |
| 9,589,271 B2 | 3/2017 | Bender et al. |
| 10,068,246 B2 | 9/2018 | Alla et al. |
| 2002/0099609 A1 | 7/2002 | Nascenzi et al. |
| 2002/0128925 A1 | 9/2002 | Angeles |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0044768 A1 | 3/2004 | Takahashi |
| 2004/0088212 A1 | 5/2004 | Hill |
| 2004/0098229 A1 | 5/2004 | Error et al. |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dertinger et al. |
| 2005/0033657 A1 | 2/2005 | Herrington et al. |
| 2005/0038900 A1 | 2/2005 | Krassner et al. |
| 2005/0166233 A1 | 7/2005 | Beyda et al. |
| 2005/0223093 A1 | 10/2005 | Hanson et al. |
| 2005/0262573 A1 | 11/2005 | Bo et al. |
| 2005/0267799 A1 | 12/2005 | Chan et al. |
| 2006/0074953 A1 | 4/2006 | Dertinger et al. |
| 2006/0089754 A1 | 4/2006 | Mortenson |
| 2006/0178996 A1 | 8/2006 | Matsushima et al. |
| 2006/0184617 A1 | 8/2006 | Nicholas et al. |
| 2006/0190616 A1 | 8/2006 | Mayerhofer et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0208711 A1 | 9/2007 | Rhoads et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2007/0300309 A1 | 12/2007 | Naito |
| 2008/0004958 A1 | 1/2008 | Ralph et al. |
| 2008/0086356 A1 | 4/2008 | Glassman et al. |
| 2008/0086523 A1 | 4/2008 | Afergan et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0262928 A1 | 10/2008 | Michaelis |
| 2008/0276179 A1 | 11/2008 | Borenstein et al. |
| 2008/0300965 A1 | 12/2008 | Doe |
| 2009/0018895 A1 | 1/2009 | Weinblatt et al. |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0125934 A1 | 5/2009 | Jones et al. |
| 2009/0171762 A1 | 7/2009 | Alkove et al. |
| 2009/0217315 A1 | 8/2009 | Malik et al. |
| 2009/0254633 A1 | 10/2009 | Olive |
| 2009/0292587 A1 | 11/2009 | Fitzgerald |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0088152 A1 | 4/2010 | Bennett |
| 2010/0088373 A1 | 4/2010 | Pinkham |
| 2010/0070621 A1 | 5/2010 | Urdan et al. |
| 2010/0114739 A1 | 5/2010 | Johnston |
| 2010/0121676 A1 | 5/2010 | Jackson |
| 2010/0153175 A1 | 6/2010 | Pearson et al. |
| 2010/0153207 A1 | 6/2010 | Roberts et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0306080 A1 | 12/2010 | Trandal et al. |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0055005 A1 | 3/2011 | Lang |
| 2011/0066497 A1 | 3/2011 | Gopinath et al. |
| 2011/0087519 A1 | 4/2011 | Fordyce, III et al. |
| 2011/0087919 A1 | 4/2011 | Deshmukh et al. |
| 2011/0093324 A1 * | 4/2011 | Fordyce, III ........ G06Q 30/0201 |
| | | 705/14.27 |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |

(56) References Cited

U.S. PATENT DOCUMENTS

| | | |
|---|---|---|
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | Von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0238520 A1 | 9/2011 | Selley |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0282997 A1 | 11/2011 | Prince et al. |
| 2011/0288907 A1 | 11/2011 | Harvey et al. |
| 2012/0005015 A1 | 1/2012 | Park et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0046996 A1 | 2/2012 | Shah et al. |
| 2012/0072469 A1 | 3/2012 | Perez et al. |
| 2012/0094639 A1 | 4/2012 | Carlson et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0130799 A1 | 5/2012 | Atwater et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0221559 A1 | 8/2012 | Kidron |
| 2012/0239407 A1 | 9/2012 | Lynch et al. |
| 2012/0239809 A1 | 9/2012 | Mazumdar et al. |
| 2012/0254466 A1 | 9/2012 | Jungck |
| 2012/0265606 A1 | 10/2012 | Patnode |
| 2012/0302222 A1 | 11/2012 | Williamson et al. |
| 2012/0310729 A1 | 12/2012 | Daito et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0014223 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0073388 A1 | 3/2013 | Heath |
| 2013/0073859 A1 | 3/2013 | Carlson et al. |
| 2013/0080256 A1 | 3/2013 | Piccionelli |
| 2013/0080259 A1 | 3/2013 | Durvasula et al. |
| 2013/0080263 A1 | 3/2013 | Goldman et al. |
| 2013/0080268 A1 | 3/2013 | Gordon et al. |
| 2013/0085894 A1 | 4/2013 | Chan et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0198383 A1 | 8/2013 | Tseng et al. |
| 2013/0204694 A1 | 8/2013 | Banister et al. |
| 2013/0212188 A1 | 8/2013 | Duterque et al. |
| 2013/0212638 A1 | 8/2013 | Wilson |
| 2013/0237254 A1 | 9/2013 | Papakipos et al. |
| 2013/0246220 A1 | 9/2013 | Hammad et al. |
| 2013/0246389 A1 | 9/2013 | Osann, Jr. |
| 2013/0246609 A1 | 9/2013 | Topchy et al. |
| 2013/0254897 A1 | 9/2013 | Reedy et al. |
| 2013/0268365 A1 | 10/2013 | Gildfind |
| 2013/0282898 A1 | 10/2013 | Kalus et al. |
| 2013/0290070 A1 | 10/2013 | Abraham et al. |
| 2013/0290096 A1* | 10/2013 | Lizotte, III ........ G06Q 30/0246 |
| | | 705/14.45 |
| 2013/0297411 A1 | 11/2013 | Van Datta et al. |
| 2013/0297467 A1 | 11/2013 | Kidron et al. |
| 2013/0325588 A1 | 12/2013 | Kalyanam et al. |
| 2013/0326597 A1 | 12/2013 | Matsushita et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0040171 A1 | 2/2014 | Segalov et al. |
| 2014/0058836 A1 | 2/2014 | Wiseman et al. |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0123253 A1 | 5/2014 | Davis et al. |
| 2014/0156761 A1 | 6/2014 | Heffernan et al. |
| 2014/0173746 A1 | 6/2014 | Armstrong-Muntner et al. |
| 2014/0207567 A1 | 7/2014 | Gould et al. |
| 2014/0278981 A1 | 9/2014 | Mersov et al. |
| 2014/0279074 A1 | 9/2014 | Chen et al. |
| 2014/0280896 A1 | 9/2014 | Papakostas et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019327 A1 | 1/2015 | Mazumdar et al. |
| 2015/0046248 A1 | 2/2015 | Ben-Yaacov et al. |
| 2015/0046579 A1 | 2/2015 | Perez et al. |
| 2015/0066586 A1* | 3/2015 | Teraoka ............ G06Q 30/0201 |
| | | 705/7.29 |
| 2015/0070585 A1 | 3/2015 | Sharif-Ahmadi et al. |
| 2015/0100907 A1 | 4/2015 | Erenrich et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0262207 A1 | 9/2015 | Rao et al. |
| 2016/0063539 A1 | 3/2016 | Alla et al. |
| 2017/0018184 A1 | 1/2017 | Northrup et al. |

FOREIGN PATENT DOCUMENTS

| | | |
|---|---|---|
| CA | 2777170 | 4/2011 |
| CA | 2872704 | 2/2016 |
| CN | 1898662 | 1/2007 |
| CN | 101077014 | 11/2007 |
| CN | 101222348 | 7/2008 |
| CN | 101505247 | 8/2009 |
| CN | 101536503 | 9/2009 |
| EP | 0325219 | 7/1989 |
| EP | 0703683 | 3/1996 |
| EP | 0744695 | 11/1996 |
| EP | 1059599 | 12/2000 |
| EP | 2991018 | 3/2016 |
| GB | 2176639 | 12/1986 |
| JP | 05324352 | 12/1993 |
| JP | 07262167 | 10/1995 |
| JP | 2001084272 | 3/2001 |
| JP | 2001282982 | 10/2001 |
| JP | 2001357192 | 12/2001 |
| JP | 2002091852 | 3/2002 |
| JP | 2002163562 | 6/2002 |
| JP | 2002373152 | 12/2002 |
| JP | 2003519877 | 6/2003 |
| JP | 2004504674 | 2/2004 |
| JP | 2006127320 | 5/2006 |
| JP | 2006127321 | 5/2006 |
| JP | 2007052633 | 3/2007 |
| JP | 2010501939 | 1/2010 |
| JP | 2010039845 | 2/2010 |
| JP | 2010257448 | 11/2010 |

(56) References Cited

FOREIGN PATENT DOCUMENTS

| | | |
|---|---|---|
| KR | 20020037980 | 5/2002 |
| KR | 20070051879 | 5/2007 |
| KR | 100765735 | 10/2007 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 0041115 | 7/2000 |
| WO | 0152168 | 7/2001 |
| WO | 0207054 | 1/2002 |
| WO | 03027860 | 4/2003 |
| WO | 2005013072 | 2/2005 |
| WO | 2005024689 | 3/2005 |
| WO | 2008022339 | 2/2008 |
| WO | 2008150575 | 12/2008 |
| WO | 2009117733 | 9/2009 |
| WO | 2010088372 | 8/2010 |
| WO | 2010104285 | 9/2010 |
| WO | 2011097624 | 8/2011 |
| WO | 2012019643 | 2/2012 |
| WO | 2012010371 | 3/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014172472 | 10/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

Chloe Albanesius, "Facebook Issues Fix for Several Tracking Cookies," internet article, http://www.pcmag.com/article2/0,2817,2393750,OO.asp, Sep. 28, 2011, 2 pages.
Emil Protalinski, "Facebook denies cookie tracking allegations," internet article, http://www.zdnet.com/blog/facebook/facebook-denies-cookie-tracking-allegations/4044, Sep. 25, 2011, 2 pages.
Emil Protalinski, "Facebook fixes cookie behavior after logging out," internet article, http://www.zdnet.com/blog/facebook/facebook-fixes-cookie-behavior-after-logging-out/4120, Sep. 27, 2011, 2 pages.
Emil Protalinski, "US congressmen ask FTC to investigate Facebook cookies," internet article, http://www.zdnet.com/blog/facebook/us-congressmen-ask-ftc-to-investigate-facebook-cookies/4218, Sep. 28, 2011, 2 pages.
Fliptop, "Fliptop Person API Documentation," https://developer.fliptop.com/documentation, retrieved on May 7, 2013 (6 pages).
Fliptop, "Get, Keep and Grow Customers with Fliptop's Customer Intelligence Application," www.fliptop.com/features#social matching, retrieved on May 7, 2013 (3 pages).
Fliptop, "What is Fliptop?", www.fliptop.com/about_us, retrieved on May 7, 2013 (1 page).
JavaScript and AJAX Form Sep. 28, 2005, [retrieved from Internet at http://www.webmasterworld.com/fomm91/4465.htm,2011] 4 pages.
Launder, "Media Journal: Nielsen to Test Online-TV Viewing Tool," The Wall Street Journal, Apr. 30, 2013, 2 pages.
"Mental Poker," Wikipedia, Jan. 12, 2010, [retrieved from Internet at en.wikipedia.org/wiki/Mental_poker on Sep. 21, 2010] 5 pages.
"Nielsen Unveils New Online Advertising Measurement," The Nielsen Company, Sep. 27, 2010, [retrieved from Internet at http://nielsen.com/us/en/insights/press-room/2010/niels_unveils_newonlineadvertisingmeasurement.html on May 31, 2012] 3 pages.
Nik Cubrilovic, "Logging out of Facebook is not enough," internet article, www.nikcub.appspot.com, Sep. 25, 2011, 3 pages.
Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Sharma, "Nielsen Gets Digital to Track Online TV Viewers," All Things, Apr. 30, 2013, 3 pages.
Coffey, "Internet Audience Measurement: A Practitioner's View," Journal of Interactive Advertising, vol. 1, No. 2, Spring 2001, 8 pages.
Vega, Tanzina, "Nielsen Introduces New Ad Measurement Product," The New York Times, Sep. 27, 2010, 7 pages.
Vranica, "Nielsen Testing a New Web-Ad Metric," The Wall Street Journal, Sep. 23, 2010, 2 pages.
International Bureau, "International Preliminary Report on Patentability," issued in connection with PCT application Serial No. PCT/US2011/052623, dated Mar. 26, 2013, 5 pages.
International Searching Authority, "International Preliminary Report on Patentability," issued in connection with application No. PCT/US2012/026760, dated Sep. 24, 2013, 4 pages.
International Searching Authority, "International Search Report," issued in connection with application No. PCT/US2011/052623, dated Mar. 8, 2012, 3 pages.
International Searching Authority, "International Search Report," issued in connection with application No. PCT/US2012/026760, dated Jan. 2, 2013, 3 pages.
International Searching Authority, "International Search Report," issued in connection with International Application No. PCT/US2013/025687 dated Jun. 2, 2013, 5 pages.
International Searching Authority, "Written Opinion of the International Searching Authority," issued in issued in connection with International Application No. PCT/US2013/025687 dated Jun. 2, 2013, 5 pages.
International Searching Authority, "Written Opinion," issued in connection with application No. PCT/US2011/052623, dated Mar. 8, 2012, 4 pages.
International Searching Authority, "Written Opinion," issued in connection with application No. PCT/US2011/065881, dated Jul. 9, 2012, 6 pages.
International Searching Authority, "Written Opinion," issued in connection with application No. PCT/US2012/026760, dated Jan. 2, 2013, 3 pages.
Patent Cooperation Treaty, "International Search Report," issued by the International Searching Authority in connection with PCT application No. PCT/US2011/052623, dated Mar. 8, 2012, 3 pages.
Patent Cooperation Treaty, "International Search Report," issued by the International Searching Authority in connection with PCT application No. PCT/US2011/065881, dated Jul. 9, 2012, 3 pages.
Patent Cooperation Treaty, "International Search Report," issued by the International Searching Authority in connection with PCT/US2011/052623, dated Mar. 8, 2012, 3 pages.
Patent Cooperation Treaty, "Written Opinion of the International Searching Authority," issued by the International Searching Authority in connection with PCT/US2011/065881, dated Jul. 9, 2012, 6 pages.
Patent Cooperation Treaty, "International Search Report and Written Opinion of the International Searching Authority," issued by the International Searching Authority in connection with PCT/US2013/045211, dated Feb. 25, 2014, 13 pages.
Australian Government, Ip Australia, "Examination Report," issued in connection with application No. AU 2013205736, dated Jun. 18, 2013, 2 pages.

(56) References Cited

OTHER PUBLICATIONS

Japan Patent Office, "Notice of Reasons for Rejection," issued in connection with Application No. 2013-529435, dated Aug. 20, 2013, 4 pages.
United States Patent and Trademark Office, "Final Office Action," issued in connection with U.S. Appl. No. 13/690,915, dated Dec. 20, 2013, 6 pages.
United States Patent and Trademark Office, "Non-Final Office Action," issued in connection with U.S. Appl. No. 13/239,005, dated Jun. 4, 2013, 28 pages.
United States Patent and Trademark Office, "Non-Final Office Action," issued in connection with U.S. Appl. No. 13/690,915, dated Sep. 5, 2013, 36 pages.
United States Patent and Trademark Office, "Non-Final Office Action," issued in connection with U.S. Appl. No. 13/691,175, dated Sep. 9, 2013, 35 pages.
United States Patent and Trademark Office, "Notice of Allowance," issued in connection with U.S. Appl. No. 13/239,005, dated Nov. 27, 2013, 46 pages.
United States Patent and Trademark Office, "Notice of Allowance," issued in connection with U.S. Appl. No. 13/513,148, dated Nov. 5, 2012, 27 pages.
United States Patent and Trademark Office, "Notice of Allowance," issued in connection with U.S. Appl. No. 13/691,175, dated May 9, 2014, 6 pages.
United States Patent and Trademark Office, "Non-Final Office Action," issued in connection with U.S. Appl. No. 13/756,493, dated Jan. 17, 2014, 32 pages.
United States Patent and Trademark Office, "Notice of Allowance and Fee(s) Due," issued in connection with U.S. Appl. No. 13/690,915, dated Apr. 9, 2014, 28 pages.
United States Patent and Trademark Office, "Notice of Allowance," issued in connection with U.S. Appl. No. 13/691,175, dated Jan. 27, 2014, 15 pages.
International Searching Authority, "International Search Report," issued in connection with application No. PCT/US2014/068621, dated Feb. 27, 2015 (3 pages).
International Searching Authority, "Written Opinion," issued in connection with application No. PCT/US2014/068621, dated Feb. 27, 2015 (7 pages).
Canadian Intellectual Property Office, "Office Action," issued in connection with Canadian Patent application No. 2,810,541, dated Jan. 20, 2015, 3 pages.
The State Intellectual Property Office of China, "First Notification of Office Action," issued in connection with Chinese application No. 201180045957.2, dated Nov. 15, 2014, 20 pages.
Japanese Patent Office, "Notice of Reasons for Rejection," issued in connection with Japanese application No. 2014-005867, dated Aug. 26, 2014, 8 pages.
Japanese Patent Office, "Final Rejection," issued in connection with Japanese application No. 2014-005867, dated Feb. 17, 2015, 6 pages.
Japanese Patent Office, "Notice of Reasons for Rejection," issued in connection with Japanese application No. 2014-005867, dated Apr. 15, 2014, 10 pages.
United States Patent and Trademark Office, "Non-Final Office Action," issued in connection with U.S. Appl. No. 14/500,297, dated Jan. 5, 2014, 7 pages.
IP Australia, "Examination Report," issued in connection with application No. AU 2013203898, dated Nov. 27, 2014, 4 pages.
IP Australia, "Examination Report," issued in connection with application No. AU 2011305429, dated Apr. 17, 2014, 4 pages.
The State Intellectual Property Office of China, "First Notification of Office Action," issued in connection with Chinese application No. 201180061437.0, dated Mar. 7, 2014, 11 pages.
The State Intellectual Property Office of China, "2nd Notification of Office Action," issued in connection with Chinese application No. 201180061437.0, dated Nov. 15, 2014, 11 pages.
Australian Government, IP Australia, "Examination Report No. 1," issued in connection with application No. AU 2011374955, dated Sep. 25, 2014, 3 pages.
Canadian Intellectual Property Office, "Office Action," issued in connection with application No. 2,873,128, dated Jan. 7, 2015, 3 pages.
Patent Cooperation Treaty, "International Search Report," issued by the International Searching Authority in connection with PCT/US2014/068165, dated Feb. 25, 2015, 3 pages.
Patent Cooperation Treaty, "International Search Report and Written Opinion of the International Searching Authority," issued by the International Searching Authority in connection with PCT/US2014/086165, dated Feb. 25, 2015, 5 pages.
United States Patent and Trademark Office, "Non-Final Office Action," issued in connection with U.S. Appl. No. 13/756,493, dated Nov. 19, 2014, 13 pages.
Canadian Intellectual Property Office, Office Action, issued in connection with Canadian Patent Application No. 2,810,264, dated Nov. 27, 2014, 5 pages.
Australian Government, IP Australia, "Examination Report No. 2," issued in connection with application No. AU 2012231667, dated Feb. 10, 2015, 3 pages.
United States Patent and Trademark Office, "Notice of Allowance" issued in connection with U.S. Appl. No. 13/756,493 , dated Mar. 17, 2015, 5 pages.
Patent Cooperation Treaty, "International Search Report," issued by the International Searching Authority in connection with PCT/US2014/068168, dated Mar. 22, 2015, 3 pages.
Patent Cooperation Treaty, "Written Opinion of the International Searching Authority," issued by the International Searching Authority in connection with PCT/US2014/068168, dated Mar. 2, 2015, 5 pages.
Patent Cooperation Treaty, "International Search Report," issued by the International Searching Authority in connection with PCT/US2011/052762, dated Aug. 22, 2012, 3 pages.
Patent Cooperation Treaty, "Written Opinion of the International Searching Authority," issued by the International Searching Authority in connection with PCT/US2011/052762, dated Aug. 22, 2012, 4 pages.
Patent Cooperation Treaty, "International Search Report and Written Opinion of the International Searching Authority," issued by the International Searching Authority in connection with PCT/US2014/035156, dated Aug. 25, 2014, 5 pages.
Patent Cooperation Treaty, "Written Opinion of the International Searching Authority," issued by the International Searching Authority in connection with PCT/US2014/035156, dated Aug. 25, 2014, 5 pages.
European Patent Office, "Supplementary European Search Report," issued in connection with European Patent Application No. EP12760524.4, dated Aug. 18, 2014, 8 pages.
Japanese Patent Office, "Notice of Reasons for Rejection," issued in connection with Japanese application No. P2013-544887, dated Aug. 12, 2014, 21 pages.
United States Patent and Trademark Office, "Non-Final Office Action," issued in connection with U.S. Appl. No. 13/396,371, dated May 9, 2014, 35 pages.
United States Patent and Trademark Office, "Non-Final Office Action," issued in connection with U.S. Appl. No. 13/209,292, dated Apr. 8, 2014, 15 pages.
Patent Cooperation Treaty, "International Search Report," issued by the International Searching Authority in connection with PCT/US2013/057045, dated Dec. 27, 2013, 3 pages.
Patent Cooperation Treaty, "Written Opinion of the International Searching Authority," issued by the International Searching Authority in connection with PCT/US2013/057045, dated Dec. 27, 2014, 5 pages.
United States Patent and Trademark Office, "Notice of Allowance and Fee(s) Due and Notice of Allowability," issued in connection with U.S. Appl. No. 13/756,493 , dated May 20, 2014, 32 pages.
Braverman, Samantha, "Are the Online Marketing Efforts of TV Shows and Programs Worthwhile?" Mar. 30, 2011, 5 pages.

(56) References Cited

OTHER PUBLICATIONS

Danaher, Peter J., Journal of Marketing Research, vol. Xxviii, "A Canonical Expansion Model for Multivariate Media Exposure Distributions: A Generalization of the Duplication of Viewing Law," Aug. 1991, 7 pages.
Enoch, Glenn and Johnson, Kelly. Journal of Advertising Research, "Cracking the Cross-Media Code: How to Use Single-Source Measures to Examine Media Cannibalization and Convergence," Jun. 2010, 13 pages.
Headen, Robert S., Klompmaker, Jay E. and Rust, Roland T., Journal and Marketing Research, vol. XVI, "The Duplication of Viewing Law and Television Media Schedule Evaluation," Aug. 1979, 9 pages.
Huang, Chun-Yao and Lin Chen-Shun, Journal of Advertising Research, vol. 35, No. 2, "Modeling the Audience's Banner Ad Exposure For Internet Advertising Planning," Summer 2006, 15 pages.
Nielsen, "How Teens Use Media: A Nielsen Report on the Myths and Realities of Teem Media Trends," Jun. 2009, 17 pages.
Arbitron Inc., Edison Research, "The Infinite Dial 2011: Navigating Digital Platforms," 2011, 83 pages.
Rust, Roland T., Klompmaker, Jay E., Journal for Advertising, vol. 10, No. 3, "A Comparative Study of Television Duplication Models," 1981, 6 pages.
Hothom et al. "Unbiased Recursive Partitioning: A Conditional Inference Framework," Journal of Computational and Geographical Statistics, vol. 15, No. 3, 2006, pp. 651-674, 21 pages.
Edwards, Jim. "Apple Wants More Advertisers To Use Its iPhone Tracking System." Business Insider. Jun. 13, 2013. Retrieved from http://www.businessinsider.com/apples-idfa-and-ifa-tracking-system-2013-6 , 2 pages.
Facebook for Business. "Measuring Conversions on Facebook, Across Devices and in Mobile Apps" Aug. 14, 2014. Retrieved from https://www.facebook.com/business/news/cross-device-measurement, 3 pages.
Patent Cooperation Treaty, "International Search Report and Written Opinion of the International Searching Authority," issued by the International Searching Authority in connection with PCT/US2014/031342, dated Jul. 28, 2014, 13 pages.
Patent Cooperation Treaty, "International Search Report and Written Opinion of the International Searching Authority," issued by the International Searching Authority in connection with PCT/US2014/034389, dated Sep. 5, 2014, 15 pages.
Patent Cooperation Treaty, "International Search Report and Written Opinion of the International Searching Authority," issued by the International Searching Authority in connection with PCT/US2014/035683, dated Sep. 12, 2014, 13 pages.
Patent Cooperation Treaty, "International Search Report and Written Opinion of the International Searching Authority," issued by the International Searching Authority in connection with PCT/US2014/037064, dated Sep. 12, 2014, 9 pages.
United States Patent and Trademark Office, "Notice of Allowance and Fee(s) Due and Notice of Allowability," issued in connection with Application No. 13/3 96,071 , dated Oct. 24, 2014, 31 pages.
Canadian Intellectual Property Office, "Office Action," issued in connection with application No. PCT/US11/065881, dated Nov. 24, 2014, 4 pages.
United States Patent and Trademark Office, "Non-Final Office Action," issued in connection with U.S. Appl. No. 14/014,050, dated Sep. 12, 2014, 32 pages.
Patent Cooperation Treaty, "International Search Report and Written Opinion of the International Searching Authority," issued by the International Searching Authority in connection with PCT/US2014/050551, dated Nov. 24, 2014, 11 pages.
Patent Cooperation Treaty, "International Preliminary Report on Patentability," mailed in connection with patent Application No. PCT/US2013/045211, dated Dec. 16, 2014, 8 pages.
IP Australia, "Examination Report No. 1," issued in connection with application No. AU 2013204865, dated Dec. 22, 2014, 3 pages.
United States Patent and Trademark Office, "Non-Final Office Action," issued in connection with U.S. Appl. No. 13/915,381, dated Jan. 30, 2015, 51 pages.
Patent Cooperation Treaty, "International Preliminary Report on Patentability," mailed in connection with patent Application No. PCT/US2013/057045, dated Mar. 3, 2015, 1 page.
Patent Cooperation Treaty, "International Search Report," issued by the International Searching Authority in connection with PCT/US2014/068623, dated Mar. 23, 2015, 3 pages.
Patent Cooperation Treaty, "Written Opinion of the International Searching Authority," issued by the International Searching Authority in connection with PCT/US2014/068623, dated Mar. 25, 2015, 8 pages.
Patent Cooperation Treaty, "International Search Report," issued by the International Searching Authority in connection with PCT/US2014/068623, dated Apr. 10, 2015, 3 pages.
Patent Cooperation Treaty, "Written Opinion of the International Searching Authority," issued by the International Searching Authority in connection with PCT/US2014/068202, dated Apr. 10, 2015, 7 pages.
European Patent Office, "European Search Report," issued in connection with European Patent Application No. EP14 00 4028.8, dated Apr. 9, 2015, 7 pages.
United States Patent and Trademark Office, "Non-Final Office Action," issued in connection with U.S. Appl. No. 14/025,575, dated Apr. 16, 2015, 72 pages.
The State Intellectual Property Office of China, "First Notification of Office Action," issued in connection with Chinese application No. 201280003504,8, dated Apr. 1, 2015, 17 pages.
Australian Government, IP Australia, "Patent Examination Report No. 1," issued in connection with application No. AU 2014260163, dated Apr. 21, 2015, 3 pages.
United States Patent and Trademark Office, "Notice of Allowance and Fee(s) Due," issued in connection with U.S. Appl. No. 14/500,297, dated May 21, 2015, 31 pages.
Australian Government, IP Australia, "Patent Examination Report No. 1," issued in connection with application No. AU 2014262739, dated May 29, 2015, 4 pages.
United States Patent and Trademark Office, "Notice of Allowance and Fee(s) Due," issued in connection with U.S. Appl. No. 13/915,381, dated Jun. 8, 2015, 44 pages.
United States Patent and Trademark Office, "Non-Final Office Action," issued in connection with U.S. Appl. No. 13/404,984, dated May 20, 2015, 27 pages.
Australian Government, IP Australia, "Patent Examination Report No. 1," issued in connection with application No. AU 2011349435, dated Nov. 4, 2014, 3 pages.
Japan Patent Office, "Notice of Reasons for Rejection," issued in connection with Application No. P2013-546286, dated Aug. 26, 2014, 5 pages.
United States Patent and Trademark Office, "Notice of Allowance and Fee(s) Due," issued in connection with U.S. Appl. No. 13/995,864, dated Oct. 28, 2014, 39 pages.
Georg et al., "How Many Millenials Visit Youtube? Estimating Unobserved Events From Incomplete Panel Data Conditioned on Demographic Covariates," Google Inc., Apr. 27, 2015, 27 pages.
Georg et al., :How Many People Visit YouTube? Inputing Missing Events in Panels With Excess Zeros, Google, Inc., 2015, 6 pages.
United States Patent and Trademark Office, "Non-Final Office Action," issued in connection with U.S. Appl. No. 14/014,044, dated Jul. 2, 2015, 22 pages.
United States Patent and Trademark Office, "Non-Final Office Action," issued in connection with U.S. Appl. No. 14/563,309, dated Aug. 5, 2015, 62 pages.
United States Patent and Trademark Office, "Non-Final Office Action," issued in connection with U.S. Appl. No. 14/025,567, dated Aug. 6, 2015, 59 pages.
Japan Patent Office, "Notice of Reasons for Rejection," issued in connection with Application No. P2015-078539, dated Jul. 14, 2015, 9 pages.
Australian Government, IP Australia, "Patent Examination Report No. 1," issued in connection with application No. AU 2013204354, dated Nov. 14, 2014, 3 pages.

(56) References Cited

OTHER PUBLICATIONS

United States Patent and Trademark Office, "Final Office Action," issued in connection with U.S. Appl. No. 14/025,575, dated Aug. 17, 2015, 78 pages.
Rainier, Maria, "Why Businesses Should Use Google Plus," The Social Media Guide, Blog post, May 7, 2013, 9 pages.
Taboga, Marco, "Linear combinations of normal random variables," Statlect | The Digital Textbook, Third Edition, Kindle Direct Publishing, 2017, 4 pages.
Whiting, Seth and Mark Dixon, "Creating An iPhone Application for Collecting Continuous ABC Data," Journal of Applied Behavior Analysis, No. 3, Fall 2012, pp. 643-656, 14 pages.
Liu et al., "Socialize Spontaneously with Mobile Applications," Department of Electrical and Computer Engineering, University of Toronto, 2012, 9 pages.
Evensen, Pål and Hein Meling, "AdScorer: An Event-Based System for Near Real-Time Impact Analysis of Television Advertisements (Industry Article)," DEBS '12: Proceedings of the 6th ACM International Conference on Distributed Event-Based Systems, Jul. 2012, 10 pages.
Dhillon et al., "Leveraging Consumer Sensing Devices for Telehealth," CHINZ '12: Proceedings of the 13th International Conference of the NZ Chapter of the ACM's Special Interest Group on Human-Computer Interaction, Jul. 2012, pp. 29-35, 7 pages.
Buyya et al., Cloudbus Toolkit for Market-Oriented Cloud Computing, Proceeding of the 1st International Conference on Cloud Computing (CloudCom 2009, Springer, Germany), Beijing, China, Dec. 1-4, 2009, Oct. 11, 2009, 21 pages.
United States Patent and Trademark Office, "Non-Final Office Action," issued in connection with U.S. Appl. No. 14/473,654, dated May 17, 2017, 16 pages.
Instituto Mexicano De La Propiedad Industrial, "Office Action," issued in connection with Mexican Patent Application No. MX/E/2017/023868, dated Jul. 18, 2017, 6 pages.
United States Patent and Trademark Office, "Notice of Allowance and Fee(s) Due," issued in connection with U.S. Appl. No. 14/014,050, dated Jul. 25, 2018, 9 pages.
United States Patent and Trademark Office, "Final Office Action," issued in connection with U.S. Appl. No. 14/014,050, dated Oct. 29, 2017, 12 pages.
United States Patent and Trademark Office, "Non-Final Office Action," issued in connection with U.S. Appl. No. 14/014,050 , dated May 9, 2017, 15 pages.
United States Patent and Trademark Office, "Non-Final Office Action," issued in connection with U.S. Appl. No. 14/014,050 , dated Sep. 28, 2016, 11 pages.
United States Patent and Trademark Office, "Non-Final Office Action," issued in connection with U.S. Appl. No. 14/014,050 , dated Nov. 23, 2015, 11 pages.
United States Patent and Trademark Office, "Non-Final Office Action," issued in connection with U.S. Appl. No. 14/014,050 , dated May 28, 2015, 4 pages.
United States Patent and Trademark Office, "Non-Final Office Action," issued in connection with U.S. Appl. No. 14/014,050 , dated Sep. 12, 2014, 10 pages.
United States Patent and Trademark Office, "Advisoiy Action Before the Filing of an Appeal Brief," issued in connection with U.S. Appl. No. 14/014,050 , dated Jan. 26, 2018, 3 pages.
Canadian Intellectual Property Office, " Notice of Allowance," issued in connection with Patent Application No. 2,872,704, dated Jun. 11, 2018, 1 page.
Mexican Institute of Industrial Property, "Office Action," issued in connection with Mexican Patent Application No. MX/2018/017652, dated Jun. 29, 2018, 8 pages.
Canadian Intellectual Property Office, "Office Action," issued in connection with Patent Application No. 2, 872,704, dated Dec. 11, 2017, 5 pages.
Mexican Patent Office, "Office Action," issued in connection with Mexican Patent Application No. MX/2014/014747, dated Dec. 14, 2017, 9 pages.
Mexican Patent Office, "Office Action," issued in connection with Mexican Patent Application No. MX/2014/014747, dated Jun. 23, 2017, 6 pages.
Canadian Intellectual Property Office, "Office Action," issued in connection with Canadian patent application No. 2,873,128, dated Mar. 30, 2017, 4 pages.
IP Australia, "Examination Report," issued in connection with Australian Patent Application No. 2012231667, dated Mar. 18, 2014, 2 pages.
United States Patent and Trademark Office, "Supplemental Notice of Allowability," issued in connection with U.S. Appl. No. 13/690,915, dated Jul. 8, 2014, 3 pages.
United States Patent and Trademark Office, "Corrected Notice of Allowability," issued in connection with U.S. Appl. No. 13/690,915, dated Nov. 6, 2014, 2 pages.
IP Australia, "Notice of Acceptance," issued in connection with Australian Patent Application No. 2013203898, dated Jun. 17, 2015, 2 pages.
IP Australia, "Notice of Acceptance," issued in connection with Australian Patent Application No. 2011305429, dated Jul. 15, 2015, 2 pages.
Japanese Patent Office, "Notice of Reasons for Rejection," issued in connection with Japanese Patent Application No. 2014-262891, dated Jan. 12, 2016, 3 pages.
European Patent Office, "Extended European Search Report," issued in connection with European Patent Application No. 11827473,7, dated Apr. 12, 2016, 9 pages.
Korean Intellectual Property Office, "Notice of Allowance," issued in connection with Korean Application No. 10-2014-7034080, dated Jan. 29, 2016, 3 pages.
United States Patent and Trademark Office, "Notice of Allowance," issued in connection with U.S. Appl. No. 14/127,414, dated Oct. 17, 2014, 7 pages.
United States Patent and Trademark Office, "Supplemental Notice of Allowability," issued in connection with U.S. Appl. No. 14/127,414, dated Nov. 17, 2014, 4 pages.
Canadian Intellectual Property Office, "Office Action," issued in connection with Application No. 2,873,128, dated Mar. 17, 2016, 4 pages.
European Patent Office, Extended European Search Report,: issued in connection with application No. EP 13833698.7, dated Apr. 7, 2016, 7 pages.
IP Australia, "Examination Report," issued in connection with Australian Patent Application No. 2014254014, dated Jun. 17, 2015, 3 pages.
Whiting et al., "Creating an Iphone Application for Collecting Continuous ABC Data," Journal of Applied Behavior Analysis, vol. 45, No. 3, Fall 2012, p. 643-656.
Liu et al., "Socialize Spontaneously with Mobile Applications," INFOCOM 2012, Orlando, FL, Mar. 25-30, 2012, p. 1942-1950.
Evensen et al., "AdScorer: An Event-Based System for Near Real-Time Impact Analysis of Televison Advertisements," DEBS'12, Jul. 16-20, 2012, p. 85-94.
Dhillon, Jaspaljeet Singh et al., "Leveraging Consumer Sensing Devices for Telehealth," CHINZ 2012, Dundin, New Zealand, Jul. 2-3, 2012, p. 29-35.
Rajkumar et al., "Cloudbus Toolkit for Market-Oriented Computing," CloudCom 2009, LNCS 5931, Springer-Verlag, Berlin, Germany, 2009, p. 24-44.
United States Patent and Trademark Office, "Non-Final Office Action," issued in connection with U.S. Appl. No. 14/959,990 dated Jul. 22, 2016, 33 pages.
IP Australia, "Patent Examination Report No. 2," issued in connection with Australian Application No. 2013204953, dated Feb. 19, 2016, 3 pages.
IP Australia, "Notice of Acceptance," issued in connection with Australian Application No. 2013204953, dated Aug. 29, 2016, 2 pages.
The State Intellectual Property Office of China, "1st Office Action," issued in connection with application No. 201380029271,3, dated Nov. 4, 2015, 12 pages.

(56) References Cited

OTHER PUBLICATIONS

The State Intellectual Property Office of China, "2nd Office Action," issued in connection with application No. 201380029271,3, dated May 31, 2015, 15 pages.
Japanese Patent Office, "Notice of Acceptance," issued in connection with Japanese Patent Application No. P2015-524512 dated Feb. 28, 2016, 3 pages.
United States Patent and Trademark Office, "Non-Final Office Action," issued in connection with U.S. Appl. No. 14/562,319, dated Jun. 1, 2015, 10 pages.
United States Patent and Trademark Office, "Non-Final Office Action," issued in connection with U.S. Appl. No. 14/014,050, dated Nov. 23, 2015, 15 pages.
United States Patent and Trademark Office, "Non-Final Office Action," issued in connection with U.S. Appl. No. 14/014,050, dated May 28, 2016, 15 pages.
United States Patent and Trademark Office, "Notice of Allowance," issued in connection with U.S. Appl. No. 14/261,085, dated Dec. 3, 2015, 13 pages.
United States Patent and Trademark Office, "Notice of Allowance," issued in connection with U.S. Appl. No. 13/984,624, dated Jul. 27, 2016, 13 pages.
"ID3," Wikipedia, downloaded from: en.wikipedia.org/wiki/ID3 on Apr. 16, 2015, 15 pages.
"Software Development Kit," Wikipedia, downloaded from: en.wikipedia/org/Software development kit on Apr. 16, 2015, 2 pages.
United States Patent and Trademark Office, "Non-Final Office Action," issued in connection with U.S. Appl. No. 13/963,737, dated Apr. 27, 2015, 13 pages.
United States Patent and Trademark Office, "Non-Final Office Action," issued in connection with U.S. Appl. No. 13/963,737, dated May 17, 2016, 15 pages.
European Patent Office, "Communication pursuant to Rules 161(2) and 162 EPC," issued in connection with European Patent Application No. 14785108,3, dated Nov. 24, 2015, 2 pages.
Canadian Intellectual Property Office, "Office Action," issued in connection with Canadian Patent Application No. 2,872,704, dated Feb. 19, 2016, 3 pages.
IP Australia, "Patent Examination Report No. 1," issued in connection with Australian Patent Application No. 2014374322 dated Nov. 16, 2016, 2 pages.
European Patent Office, "Examination Report," issued in connection with European Patent Application No. 14004028,8, dated Dec. 23, 2016, 8 pages.
Canadian Intellectual Property Office, "Office Action," issued in connection with Canadian Patent Application No. 2,872,704, dated Jan. 11, 2017, 5 pages.
Mexican Intellectual Property Office, "Office Action," issued in connection with Mexican Patent Application No. MX/a/2014/014747, dated Jan. 10, 2017, 7 pages.
European Patent Office, "Communication Pursuant to Article 94(3) EPC," issued in connection with European Patent Application No. 13833698.7, dated Jan. 31, 2017, 4 pages.
The State Intellectual Property Office of China, "Notice of Decision of Granting Patent Right for Invention," issued in connection with Chinese Patent Application No. 201380029271.3, dated Feb. 6, 2017, 3 pages.
United States Patent and Trademark Office, "Notice of Allowance," issued in connection with U.S. Appl. No. 13/691,175, dated Jun. 5, 2015, (64 pages).
Instituto Mexicano De La Propiedad Industrial, "Office Action," in connection with Mexican Patent Application No. MX/a/2014/014747, dated Feb. 8, 2019, 12 pages.

United States Patent and Trademark Office, "Final Office Action," issued in connection with U.S. Appl. No. 13/963,737, dated Sep. 21, 2015, 14 pages.
State Intellectual Property Office of China, "Second Office Action," issued in connection with Chinese Patent Application No. 201180045957.2, dated Jul. 29, 2015 (5 pages).
Japanese Patent Office, "Notice of Reasons for Rejection," issued in connection with Japanese Patent Application No. P2015-0524512 dated Jun. 30, 2015 (6 pages).
Australian Government, IP Australia, "Patent Examination Report No. 1," issued in connection with Australian Application No. 2013204953, dated Dec. 23, 2014 (5 pages).
United States Patent and Trademark Office, "Notice of Allowance," issued in connection with U.S. Appl. No. 14/641,982, dated Sep. 2, 2015 (13 pages).
Canadian Intellectual Property Office, "Office Action," dated May 25, 2020 in connection with Canadian Patent Application No. 3,040,572, 5 pages.
Canadian Intellectual Property Office, "Office Action," dated May 10, 2021 in connection with Canadian Patent Application No. 3,040,572, 7 pages.
China National Intellectual Property Administration, "First Notification of Office Action," dated Apr. 2, 2019 in connection with Chinese Patent Application No. 201410858245.8, 13 pages, including translation,.
China National Intellectual Property Administration, "Second Notification of Office Action," dated Apr. 3, 2020 in connection with Chinese Patent Application No. 201410858245.8, 11 pages, including translation.
China National Intellectual Property Administration, "Decision on Rejection," dated Mar. 3, 2021 in connection with Chinese Patent Application No. 201410858245.8, 8 pages, including translation.
European Patent Office, "Summons to Attend Oral Proceedings," dated Nov. 29, 2017 in connection with European Patent Application No. 14004028.8, 10 pages.
European Patent Office, "Summons to Attend Oral Proceedings," dated Dec. 18, 2017 in connection with European Patent Application No. 14004028.8, 2 pages.
European Patent Office, "Decision to Refuse a European Patent Application," dated May 28, 2018 in connection with European Patent Application No. 14004028.8, 23 pages.
United States Patent and Trademark Office, "Non-Final Office Action," dated Oct. 31, 2016 in connection with U.S. Appl. No. 14/473,654, 17 pages.
United States Patent and Trademark Office, "Final Office Action," dated Nov. 3, 2017 in connection with U.S. Appl. No. 14/473,654, 16 pages.
United States Patent and Trademark Office, "Non-Final Office Action," dated Aug. 7, 2018 in connection with U.S. Appl. No. 14/473,654, 15 pages.
United States Patent and Trademark Office, "Final Office Action," dated Feb. 4, 2019 in connection with U.S. Appl. No. 14/473,654, 12 pages.
United States Patent and Trademark Office, "Advisoiy Action," dated Apr. 19, 2019 in connection with U.S. Appl. No. 14/473,654, 3 pages.
United States Patent and Trademark Office, "Non-Final Office Action," dated Sep. 27, 2019 in connection with U.S. Appl. No. 14/473,654, 10 pages.
United States Patent and Trademark Office, "Final Office Action," dated Mar. 31, 2020 in connection with U.S. Appl. No. 14/473,654, 12 pages.
United States Patent and Trademark Office, "Advisoiy Action," dated Jul. 2, 2020 in connection with U.S. Appl. No. 14/473,654, 4 pages.

* cited by examiner

| | Mobile App Publisher | Control Group | Exposed Group | Sales in Control Group | Sales in Exposed Group | Sales Lift |
|---|---|---|---|---|---|---|
| 302 → | Publisher A | 12200 | 35400 | 4200 (34.4%) | 22100 (62.4%) | 81.3% |
| 304 → | Publisher B | 17500 | 30100 | 5600 (32%) | 10600 (35.2%) | 10% |

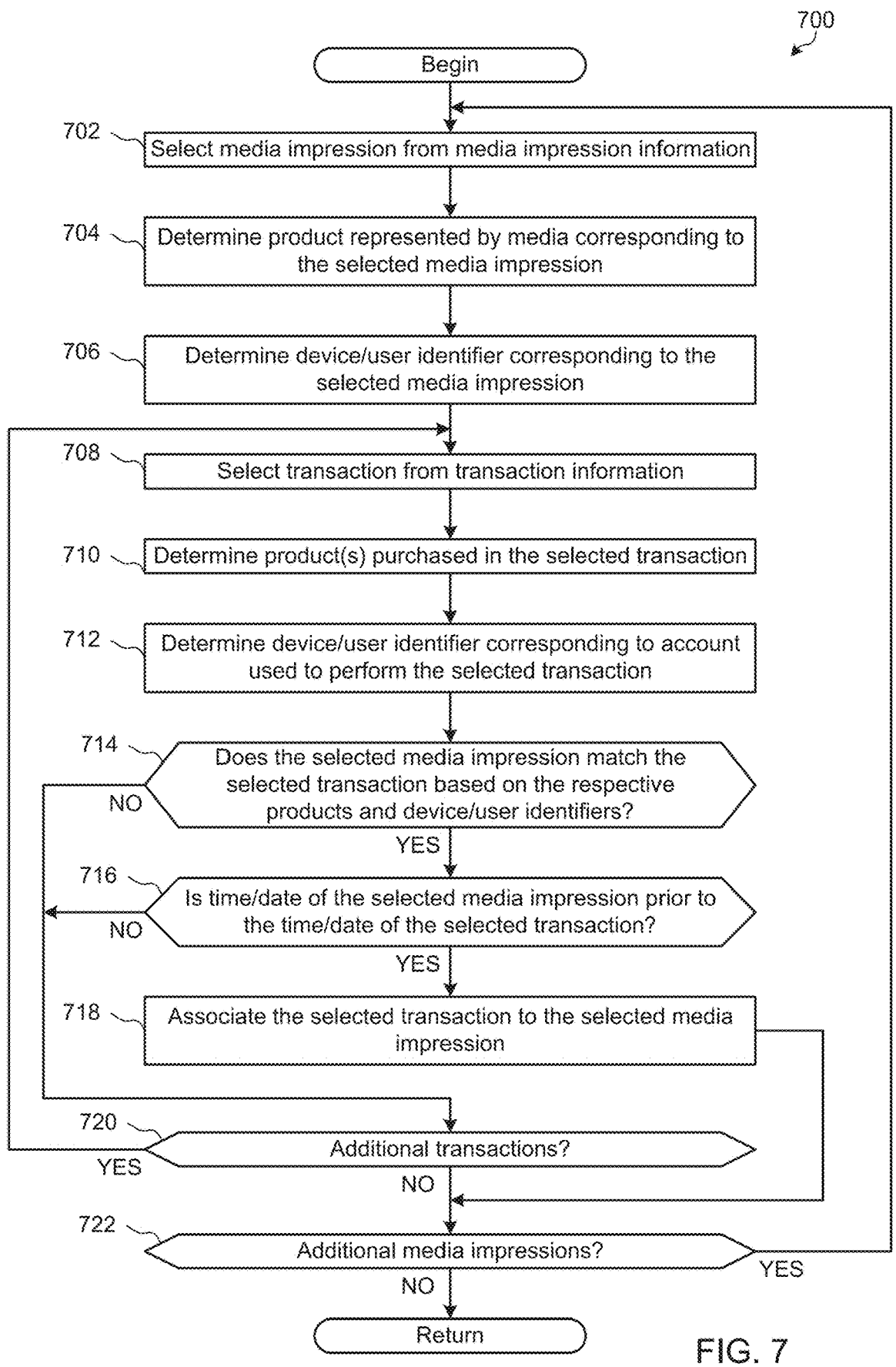

METHODS AND APPARATUS TO ASSOCIATE TRANSACTIONS WITH MEDIA IMPRESSIONS

RELATED APPLICATION

This patent arises from a continuation of U.S. patent application Ser. No. 14/473,654, entitled "METHODS AND APPARATUS TO ASSOCIATE TRANSACTIONS WITH MEDIA IMPRESSIONS," filed on Aug. 29, 2014. U.S. patent application Ser. No. 14/473,654 is incorporated herein in its entirety. Priority to U.S. patent application Ser. No. 14/473,654 is claimed.

FIELD OF THE DISCLOSURE

The present disclosure relates generally to monitoring media and, more particularly, to methods and apparatus to associate transactions with media impressions.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media (e.g., television programs or radio programs, movies, DVDs, advertisements, etc.) exposed to those panel members. In this manner, the audience measurement entity can determine exposure measures for different media based on the collected media measurement data.

Techniques for monitoring user access to Internet resources such as web pages, advertisements and/or other media have evolved significantly over the years. Some prior systems perform such monitoring primarily through server logs. In particular, entities serving media on the Internet can use such prior systems to log the number of requests received for their media at their server.

BRIEF DESCRIPTION OF THE DRAWINGS

FIG. 7 is a flow diagram representative of example machine readable instructions which may be executed to implement the example impression-transaction analyzer of FIG. 2 to correlate transactions involving a product to media impressions corresponding to the product.

DETAILED DESCRIPTION

Figure 1:
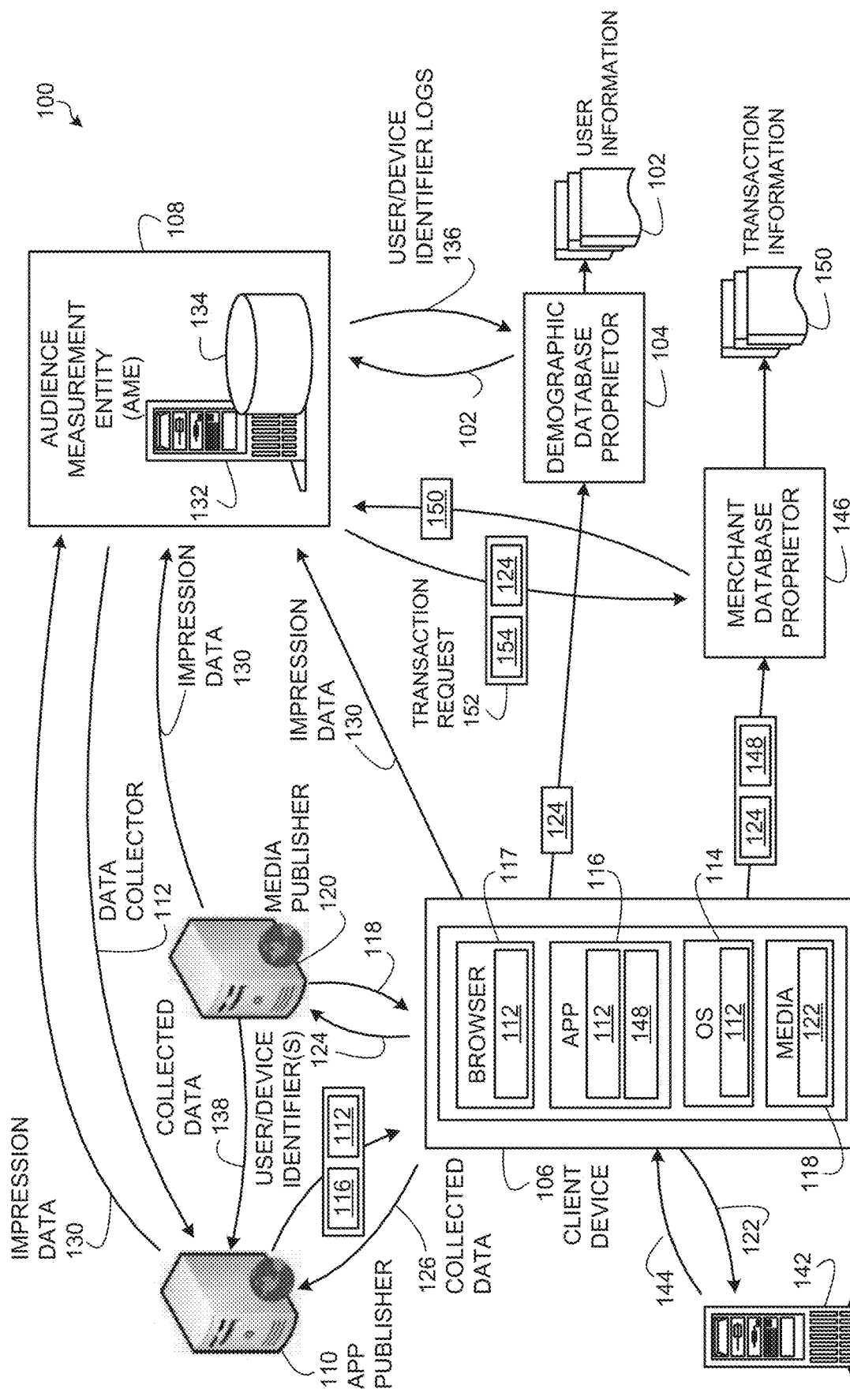
FIG. 1 depicts an example system to collect impressions of media presented at mobile devices and to collect user information from distributed database proprietors for associating with the collected impressions.

Techniques for monitoring user access to Internet resources such as web pages, advertisements and/or other media have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from servers to increase the server log counts corresponding to the requested media. Secondly, media is sometimes retrieved once, cached locally and then repeatedly viewed from the local cache without involving the server in the repeat viewings. Server logs cannot track these views of cached media because reproducing locally cached media does not require re-requesting the media from a server. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the Hypertext Markup Language (HTML) of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity (AME) (e.g., any entity interested in measuring or tracking audience exposures to advertisements, media, and/or any other media) that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

It is useful, however, to link demographics and/or other user information to the monitoring information. To address this issue, the AME establishes a panel of users who have agreed to provide their demographic information and to have their Internet browsing activities monitored. When an individual joins the panel, they provide detailed information concerning their identity and demographics (e.g., gender, race, income, home location, occupation, etc.) to the AME. The AME sets a cookie on the panelist computer that enables the AME to identify the panelist whenever the panelist accesses tagged media and, thus, sends monitoring information to the AME.

Since most of the clients providing monitoring information from the tagged pages are not panelists and, thus, are unknown to the AME, it is necessary to use statistical methods to impute demographic information based on the data collected for panelists to the larger population of users providing data for the tagged media. However, panel sizes of AMEs remain small compared to the general population of users. Thus, a problem is presented as to how to increase panel sizes while ensuring the demographics data of the panel is accurate.

There are many database proprietors operating on the Internet. These database proprietors provide services (e.g., social networking services, email services, media access services, etc.) to large numbers of subscribers. In exchange for the provision of such services, the subscribers register with the proprietors. As part of this registration, the subscribers provide detailed demographic information. Examples of such database proprietors include social network providers such as Facebook, Myspace, Twitter, etc. These database proprietors set cookies on the computers of their subscribers to enable the database proprietors to recognize registered users when such registered users visit their websites.

Traditionally, AMEs (also referred to herein as "ratings entities") determine reach for advertising and media programming based on registered panel members. That is, an AME enrolls people that consent to being monitored into a panel. During enrollment, the AME receives information from the enrolling people so that subsequent correlations may be made between advertisement/media exposure to those panelists and different demographic markets. Unlike traditional techniques in which AMEs rely solely on their own panel member data to collect demographics-based audience measurement, example methods, apparatus, and/or articles of manufacture disclosed herein enable an AME to share information with other entities that operate based on user registration models. As used herein, a user registration model is a model in which users subscribe to services of those entities by creating an account and providing information about themselves. Sharing of information associated with registered users of database proprietors enables an AME to extend or supplement their panel data with substantially reliable information from external sources (e.g., database proprietors), thus extending the coverage, accuracy, and/or completeness of their audience measurements. Such access also enables the AME to monitor persons who would not otherwise have joined an AME panel. Any entity having a database identifying characteristics of a set of individuals may cooperate with the AME. Such entities may be referred to as "database proprietors" and include entities such as wireless service carriers, mobile software/service providers, social medium sites (e.g., Facebook, Twitter, Google, etc.), and/or any other Internet sites such as Yahoo!, MSN, Apple iTunes, Experian, etc. that collect demographic data of users which may be in exchange for a service.

Examples disclosed herein may be implemented by an AME (e.g., any entity interested in measuring or tracking audience exposures to advertisements, media, and/or any other media) in cooperation with any number of database proprietors such as online web services providers to develop online media exposure metrics. Such database proprietors/online web services providers may be wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

An impression corresponds to a home or individual having been exposed to the corresponding media and/or advertisement. Thus, an impression represents a home or an individual having been exposed to an advertisement or media or group of advertisements or media. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

As used herein, the term "product" is expressly defined to refer to any type of purchasable item, whether tangible or intangible. In particular, the term "product" is expressly defined to include goods, services, combinations of goods and/or services, and items that are part-good and part-service.

Examples methods and apparatus disclosed herein may be used to correlate media impressions occurring on mobile devices to subsequent commercial transactions. Example commercial transactions include purchases of a product from an online merchant such as Amazon®, eBay®, or any other online merchant, including online merchants that also have physical locations at which transactions may occur directly with consumers (e.g., brick and mortar stores). Example methods and apparatus disclosed herein may be used to measure the effectiveness of mobile advertising campaigns by comparing sales of a product from a time period prior to an advertising campaign to sales of the product from a time period subsequent to an advertising campaign. Additionally or alternatively, disclosed example methods and apparatus may be used to compare the effectiveness of media between different publishers (e.g., publisher effectiveness).

Significantly, example methods and apparatus disclosed herein are capable of tracking the correlation of media impressions to changes in purchase habits at the individual user account level (e.g., an account kept with the merchant by a user, which is used to purchase a product from that merchant). For example, a media impression occurring at a device having a unique identifier may be matched to the subsequent purchase of a product advertised in the media impression. In response, examples disclosed herein may be used to draw the inference that the media impression was related to influencing the subsequent purchase. Additionally, the correlation between media impressions and sales can be determined for devices and/or user accounts with which the audience measurement entity does not have any prior information or prior relationship.

To match media impressions to purchases, example methods and apparatus disclosed herein utilize a user/device identifier and media impression information collected from a mobile device. The example media impression information represents media impressions occurring at the mobile device. In example methods and apparatus, commercial transaction information associated with the user/device identifier is also obtained. Example commercial transaction information includes data describing commercial transactions conducted using an account that has been accessed by a device associated with the user/device identifier. A user account may be correlated to multiple unique identifiers. Example methods and apparatus disclosed herein associate the media impression information with the commercial transaction information to, for example, determine a cause and effect relationship between the impression and the commercial transaction. Examples disclosed herein may match impressions occurring on one device with transactions performed using a different device.

Examples of device types from which user/device identifiers may be collected include smartphones (e.g., iPhones, Android OS-based smartphones, Blackberry smartphones, Windows Mobile-based smartphones, etc.), tablet computers (e.g., iPads, Android OS-based tablet computers, etc.), portable media players (e.g., iPods, etc.), and/or other device types. Such device types may be cookie-based devices (e.g., devices that run cookie-based applications/software) and/or non-cookie-based devices (e.g., devices such as Apple iOS devices that run applications/software that do not employ cookies).

While examples disclosed herein are described with reference to compensating or adjusting impression information obtained from mobile devices, the examples are also applicable to non-mobile devices such as desktop computers, televisions, video game consoles, and/or other devices.

In contrast to prior art methods of evaluating the effectiveness of media, example methods and apparatus disclosed herein leverage the computing device-based and network-based delivery of media impressions, as well as the use of online transaction platforms, to evaluate the effectiveness of media at actually driving (or inhibiting) sales activity. Some such example methods and apparatus reduce the manual resources, computing resources, and networking resources used to collect, analyze, and/or correlate impression information and transaction information to evaluate media effectiveness at driving product sales. Some examples enable the conservation of computing and/or networking resources by relating transactions to impressions via a unique identifier, thereby reducing or eliminating computations and/or communications previously required to determine a transaction from the occurrence of an impression at a computing device (e.g., identifying the user, retrieving information about the user, determining whether the user has an account at a merchant, obtaining permission from the user to access his or her account information, sorting through the transactions to identify the products, etc.).

Furthermore, example methods and apparatus disclosed herein provide more accurate measurements than prior methods of estimating media effectiveness at driving product sales, because the impression data and the transaction data more accurately reflect the actual incidences of impressions and sales and because impressions are linked directly to corresponding sales by relating the impression data to the transaction data. This achieves a significant improvement in the audience analytics and advertising field. Such improvements can reduce the amount of network resources used for delivering advertisements by enabling the quick elimination of ineffective advertisements and/or ineffective advertisement platforms. In a world of limited resources, this elimination of waste has the beneficial effect of freeing resources for other beneficial purposes.

FIG. 1 depicts an example system 100 to collect user information (e.g., user information 102) from a database proprietor 104 for associating with impressions of media presented at a mobile device 106. In the illustrated examples, user information 102 or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Examples disclosed herein are described in connection with a mobile device, which may be a mobile phone, a mobile communication device, a tablet, a gaming device, a portable media presentation device, etc. However, examples disclosed herein may be implemented in connection with non-mobile devices such as internet appliances, smart televisions, internet terminals, computers, or any other device capable of presenting media received via network communications.

In the illustrated example of FIG. 1, to track media impressions on the mobile device 106, an audience measurement entity (AME) 108 partners with or cooperates with an app publisher 110 to download and install a data collector 112 on the mobile device 106. In the example of FIG. 1, the AME 108 provides the data collector 112 to the app publisher 110 for inclusion of the data collector 112 in apps downloaded by mobile devices from the app publisher 110. The app publisher 110 of the illustrated example may be a software app developer that develops and distributes apps to mobile devices and/or a distributor that receives apps from software app developers and distributes the apps to mobile devices. The data collector 112 may be included in other software loaded onto the mobile device 106, such as the operating system 114, an application (or app) 116, a web browser 117, and/or any other software.

Any of the example software 114-117 may present media 118 received from a media publisher 120. The media 118 may be an advertisement, video, audio, text, a graphic, a web page, news, educational media, entertainment media, or any other type of media. In the illustrated example, a media ID 122 is provided in the media 118 to enable identifying the media 118 so that the AME 108 can credit the media 118 with media impressions when the media 118 is presented on the mobile device 106 or any other device that is monitored by the AME 108.

The data collector 112 of the illustrated example includes instructions (e.g., Java, java script, or any other computer language or script) that, when executed by the mobile device 106, cause the mobile device 106 to collect the media ID 122 of the media 118 presented by the app program 116 and/or the mobile device 106, and to collect one or more device/user identifier(s) 124 stored in the mobile device 106. The device/user identifier(s) 124 of the illustrated example include identifiers that can be used by the demographic database proprietor 104 to identify the user or users of the mobile device 106, and to locate user information 102 corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., an "Identifier for Advertising" (IDFA), advertising service identifiers, device usage analytics service identifiers, demographics collection service identifiers), web storage data, document object model (DOM) storage data, local shared objects (also referred to as "Flash cookies"), etc. In some examples, fewer or more device/user identifier(s) 124 may be used. In addition, although only one demographic database proprietor 104 is shown in FIG. 1, the AME 108 may partner with any number of demographic database proprietors to collect distributed user information (e.g., the user information 102).

In some examples, the mobile device 106 may not allow access to identification information stored in the mobile device 106. For such instances, the disclosed examples enable the AME 108 to store an AME-provided identifier (e.g., an identifier managed and tracked by the AME 108) in the mobile device 106 to track media impressions on the mobile device 106. For example, the AME 108 may provide instructions in the data collector 112 to set an AME-provided identifier in memory space accessible by and/or allocated to the app program 116. In some such examples, the data collector 112 uses the identifier as a device/user identifier 124. In such examples, the AME-provided identifier set by the data collector 112 persists in the memory space even when the app program 116 and the data collector 112 are not running. In this manner, the same AME-provided identifier can remain associated with the mobile device 106 for extended durations and/or be used across multiple apps. In some examples in which the data collector 112 sets an identifier in the mobile device 106, the AME 108 may recruit a user of the mobile device 106 as a panelist, and may store user information collected from the user during a panelist registration process and/or collected by monitoring user activities/behavior via the mobile device 106 and/or any other device used by the user and monitored by the AME 108. In this manner, the AME 108 can associate user information of the user (from panelist data stored by the AME 108) with media impressions attributed to the user on the mobile device 106.

In the illustrated example, the data collector 112 sends the media ID 122 and the one or more device/user identifier(s) 124 as collected data 126 to the app publisher 110. Alternatively, the data collector 112 may be configured to send the collected data 126 to another collection entity (other than the app publisher 110) that has been contracted by the AME 108 or is partnered with the AME 108 to collect media ID's (e.g., the media ID 122) and device/user identifiers (e.g., the device/user identifier(s) 124) from mobile devices (e.g., the mobile device 106).

In the illustrated example, the app publisher 110 (or a collection entity) sends the media ID 122 and the device/user identifier(s) 124 as impression data 130 to a server 132 at the AME 108. The impression data 130 of the illustrated example may include one media ID 122 and one or more device/user identifier(s) 124 to report a single impression of the media 118, or it may include numerous media ID's 122 and device/user identifier(s) 124 based on numerous instances of collected data (e.g., the collected data 126) received from the mobile device 106 and/or other mobile devices to report multiple impressions of media.

In the illustrated example, the server 132 stores the impression data 130 in an AME media impressions store 134 (e.g., a database or other data structure). Subsequently, the AME 108 sends the device/user identifier(s) 124 to the demographic database proprietor 104 to receive user information 102 corresponding to the device/user identifier(s) 124 from the demographic database proprietor 104 so that the AME 108 can associate the user information with corresponding media impressions of media (e.g., the media 118) presented at mobile devices (e.g., the mobile device 106).

In some examples, to protect the privacy of the user of the mobile device 106, the media identifier 122 and/or the device/user identifier(s) 124 are encrypted before they are sent to the AME 108 and/or to the demographic database proprietor 104. In other examples, the media identifier 122 and/or the device/user identifier(s) 124 are not encrypted.

After the AME 108 receives the device/user identifier(s) 124, the AME 108 sends device/user identifier logs 136 to the demographic database proprietor 104. In some examples, each of the device/user identifier logs 136 may include a single device/user identifier 124, or it may include numerous aggregate device/user identifiers 124 received over time from one or more mobile devices. After receiving the device/user identifier logs 136, the demographic database proprietor 104 looks up its users corresponding to the device/user identifiers 124 in the respective logs 136. In this manner, the demographic database proprietor 104 collects user information 102 corresponding to users identified in the device/user identifier logs 136 for sending to the AME 108. For example, if the demographic database proprietor 104 is a wireless service provider and the device/user identifier log 136 includes IMEI numbers recognizable by the wireless service provider, the wireless service provider accesses its subscriber records to find users having IMEI numbers matching the IMEI numbers received in the device/user identifier log 136. When the users are identified, the wireless service provider copies the users' user information to the user information 102 for delivery to the AME 108.

In some other examples, the data collector 112 is configured to collect the device/user identifier(s) 124 from the mobile device 106. The example data collector 112 sends the device/user identifier(s) 124 to the app publisher 110 in the collected data 126, and it also sends the device/user identifier(s) 124 to the media publisher 120. In some such other examples, the data collector 112 does not collect the media ID 122 from the media 118 at the mobile device 106 as the data collector 112 does in the example system 100 of FIG. 1. Instead, the media publisher 120 that publishes the media 118 to the mobile device 106 retrieves the media ID 122 from the media 118 that it publishes. The media publisher 120 then associates the media ID 122 to the device/user identifier(s) 124 received from the data collector 112 executing in the mobile device 106, and sends collected data 138 to the app publisher 110 that includes the media ID 122 and the associated device/user identifier(s) 124 of the mobile device 106. For example, when the media publisher 120 sends the media 118 to the mobile device 106, it does so by identifying the mobile device 106 as a destination device for the media 118 using one or more of the device/user identifier (s) 124 received from the mobile device 106. In this manner, the media publisher 120 can associate the media ID 122 of the media 118 with the device/user identifier(s) 124 of the mobile device 106 indicating that the media 118 was sent to the particular mobile device 106 for presentation (e.g., to generate an impression of the media 118).

In some other examples in which the data collector 112 is configured to send the device/user identifier(s) 124 to the media publisher 120, the data collector 112 does not collect the media ID 122 from the media 118 at the mobile device 106. Instead, the media publisher 120 that publishes the media 118 to the mobile device 106 also retrieves the media ID 122 from the media 118 that it publishes. The media publisher 120 then associates the media ID 122 with the device/user identifier(s) 124 of the mobile device 106. The media publisher 120 then sends the impression data 130, including the media ID 122 and the device/user identifier(s) 124, to the AME 108. For example, when the media publisher 120 sends the media 118 to the mobile device 106, it does so by identifying the mobile device 106 as a destination device for the media 118 using one or more of the device/user identifier(s) 124. In this manner, the media publisher 120 can associate the media ID 122 of the media 118 with the device/user identifier(s) 124 of the mobile device 106 indicating that the media 118 was sent to the particular mobile device 106 for presentation (e.g., to generate an impression of the media 118). In the illustrated example, after the AME 108 receives the impression data 130 from the media publisher 120, the AME 108 can then send the device/user identifier log 136 to the demographic database proprietor 104 to request the user information 102 as described above in connection with FIG. 1.

Although the media publisher 120 is shown separate from the app publisher 110 in FIG. 1, the app publisher 110 may implement at least some of the operations of the media publisher 120 to send the media 118 to the mobile device 106 for presentation. For example, advertisement providers, media providers, or other information providers may send media (e.g., the media 118) to the app publisher 110 for publishing to the mobile device 106 via, for example, the app program 116 when it is executing on the mobile device 106. In some such examples, the app publisher 110 implements the operations described above as being performed by the media publisher 120.

Additionally or alternatively, in contrast with the examples described above in which the mobile device 106 sends device/user identifiers 124 to the audience measurement entity 108 (e.g., via the application publisher 110, the media publisher 120, and/or another entity), in other examples the mobile device 106 (e.g., the data collector 112 installed on the mobile device 106) sends the identifiers (e.g., the user/device identifier(s) 124) directly to the database proprietor 104 (e.g., not via the AME 108). In some such examples, the example mobile device 106 sends the media identifier 122 to the audience measurement entity 108 (e.g., directly or through an intermediary such as via the application publisher 110), but does not send the media identifier 122 to the database proprietors 104.

As mentioned above, the example demographic database proprietor 104 provides the user information 102 to the example AME 108 for matching with the media identifier 122 to form media impression information. As also mentioned above, the database proprietor 104 is not provided copies of the media identifier 122. Instead, the mobile device 106 provides the database proprietor 104 with impression identifiers 140. An impression identifier 140 uniquely identifies an impression event relative to other impression events of the mobile device 106 (and relative to the impression events of other devices) so that an occurrence of an impression at the mobile device 106 can be distinguished from other occurrences of impressions. However, the impression identifier 140 does not itself identify the media associated with that impression event. In such examples, the impression data 130 from the mobile device 106 to the AME 108 also includes the impression identifier 140 and the corresponding media identifier 122.

To match the user information 102 with the media identifier 122, the example demographic database proprietor 104 provides the user information 102 to the AME 108 in association with the impression identifier 140 for the impression event that triggered the collection of the user information 102. In this manner, the AME 108 can match the impression identifier 140 received from the mobile device 106 to a corresponding impression identifier 140 received from the demographic database proprietor 104 to associate the media identifier 122 received from the mobile device 106 with demographic information in the user information 102 received from the database proprietor 104. The impression identifier 140 can additionally be used for reducing or avoiding duplication of demographic information. For example, the example demographic database proprietor 104 may provide the user information 102 and the impression identifier 140 to the AME 108 on a per-impression basis (e.g., each time a mobile device 106 sends a request including a device/user identifier 124 and an impression identifier 140 to the demographic database proprietor 104) and/or on an aggregated basis (e.g., send a set of user information 102, which may include indications of multiple impressions at a mobile device 102 (e.g., multiple impression identifiers 140), to the AME 108 presented at the mobile device 106).

The above examples illustrate methods and apparatus for collecting impression data at an audience measurement entity (or other entity). The examples discussed above may be used to collect impression information for any type of media, including static media (e.g., advertising images), streaming media (e.g., streaming video and/or audio, including content, advertising, and/or other types of media), and/or other types of media. For static media (e.g., media that does not have a time component such as images, text, a webpage, etc.), in some examples the AME 108 records an impression once for each occurrence of the media being presented, delivered, or otherwise provided to the mobile device 106. For streaming media (e.g., video, audio, etc.), in some examples the example AME 108 measures demographics for media occurring over a period of time. For example, the AME 108 (e.g., via the app publisher 110 and/or the media publisher 120) provides beacon instructions to a client application or client software (e.g., the OS 114, the web browser 117, the app 116, etc.) executing on the mobile device 106 when media is loaded at client application/software 114-117. In some such examples, the beacon instructions cause the client application/software 114-117 to transmit a request (e.g., a pingback message) to an impression monitoring server at regular and/or irregular intervals (e.g., every minute, every 30 seconds, every 2 minutes, etc.). The example impression monitoring server 132 identifies the requests from the web browser 117 and, in combination with one or more database proprietors, matches the impression information for the media with demographics of the user of the web browser 117.

In some examples, a user loads (e.g., via the browser 117) a web page from a web site publisher (e.g., a web page corresponding to a particular 60 minute video). An instruction which is a part of or referred to by the example web page (e.g., a beacon instruction) causes the browser 117 and/or the data collector 112 to send a pingback message (e.g., a beacon request) to a beacon server 142. For example, when the beacon instructions are executed by the example browser 117, the beacon instructions cause the data collector 112 to send pingback messages (e.g., beacon requests, HTTP requests, pings) to the impression monitoring server 132 at designated intervals (e.g., once every minute or any other suitable interval). The example beacon instructions (or a redirect message from, for example, the impression monitoring server 132 or the database proprietor 104) further cause the browser 117 and/or the data collector 112 to send pingback messages or beacon requests to the database proprietor 104 that collect and/or maintain demographic information about users.

The database proprietor 104 transmits demographic information about the user associated with the data collector 112 and/or the browser 117 for combining or associating with the impression determined by the impression monitoring server 132. If the user closes the web page containing the video before the end of the video, the beacon instructions are stopped, and the data collector 112 stops sending the pingback messages to the impression monitoring server 132. In some examples, the pingback messages include timestamps and/or other information indicative of the locations in the video to which the numerous pingback messages correspond. By determining a number and/or content of the pingback messages received at the impression monitoring server 132 from the mobile device 106, the example impression monitoring server 132 can determine that the user watched a particular length of the video (e.g., a portion of the video for which pingback messages were received at the impression monitoring server 132).

The mobile device 106 of the illustrated example executes a client application/software 114-117 that retrieves data from a host website (e.g., www.acme.com) that provides (e.g., serves) the media 118 (e.g., audio, video, interactive media, streaming media, etc.) is obtained for presenting via the mobile device 106. In the illustrated example, the media 118 (e.g., advertisements and/or content) is tagged with identifier information (e.g., a media ID 122, a creative type ID, a placement ID, a publisher source URL, etc.) and a beacon instruction. The example beacon instruction causes the client application/software 114-117 to request further beacon instructions from a beacon server 142 that will instruct the client application/software 114-117 on how and where to send beacon requests to report impressions of the media 118. For example, the example client application/software 114-117 transmits a request including an identification of the media 118 (e.g., the media identifier 122) to the beacon server 142. The beacon server 142 generates and/or returns beacon instructions 144 to the example mobile device 106. Although the beacon server 142 and the impression monitoring server 132 are shown separately, in some examples the beacon server 142 and the impression monitoring server 132 are combined. In the illustrated example, beacon instructions 144 include a URL of the database proprietor (e.g., the demographic database proprietors 104) or any other server to which the mobile device 106 should send beacon requests (e.g., impression requests). In some examples, a pingback message or beacon request may be implemented as an HTTP request. However, whereas a transmitted HTTP request identifies a webpage or other resource to be downloaded, the pingback message or beacon request includes audience measurement information (e.g., ad campaign identification, content identifier, and/or device/user identification information) as its payload. The server to which the pingback message or beacon request is directed is programmed to log the audience measurement data of the pingback message or beacon request as an impression (e.g., an ad and/or content impression depending on the nature of the media tagged with the beaconing instructions). In some examples, the tagged media 118 include the beacon instructions 144. In such examples, the client application/software 114-117 does not need to request beacon instructions 144 from a beacon server 142 because the beacon instructions 144 are already provided in the tagged media 118.

When the beacon instructions 144 are executed by the mobile device 106, the beacon instructions 144 cause the mobile device 106 to send beacon requests (e.g., repeatedly at designated intervals) to a remote server (e.g., the impression monitoring server 132, the media publisher 120, the database proprietor 104, or another server) specified in the beacon instructions 144. In the illustrated example, the specified server is a server of the audience measurement entity 108, such as the impression monitoring server 132. The beacon instructions 144 may be implemented using Javascript or any other types of instructions or script executable via a client application (e.g., a web browser) including, for example, Java, HTML, etc.

While the example system 100 of FIG. 1 is illustrated as having one database proprietor 104, multiple database proprietors 104 may be used.

Many applications and websites are available that enable users of mobile devices to perform commercial transactions with a merchant (e.g., a retailer, an online merchant, a club store, a wholesaler, or any other purveyor of goods or services). For example, Amazon® provides an application for devices to enable a user of the device to login to an Amazon account, browse and/or search for items, add the items to a shopping cart, enter payment information, configure shipping details, and/or finalize an order. Amazon provides such an application for multiple different types of devices (e.g., devices executing different operating systems). Many other such applications are available for other merchants. Merchants who also have physical locations at which transactions can be performed often provide applications for performing commercial transactions from electronic devices similar to the transaction described above.

The example system 100 of FIG. 1 includes a merchant database proprietor 146. The example merchant database proprietor 146 of FIG. 1 stores account information for users who have registered with the merchant database proprietor 146. In the example of FIG. 1, users who register with the merchant database proprietor 146 are then permitted to place orders for (e.g., purchase) products offered by the merchant database proprietor 146 and/or offered by third parties using ordering services provided by the merchant database proprietor 146. For example, the merchant database proprietor 146 may list products offered by a third party, facilitate payment by the user for a purchased product, and/or facilitate shipping of the purchased product to the user.

The example merchant database proprietor 146 of FIG. 1 provides an application (e.g., the app 116 of FIG. 1) for download to the mobile device 106. For example, the mobile device 106 may download the app 116 from the app publisher 110 and/or directly from the merchant database proprietor 146.

When the app 116 is installed on the mobile device 106, the example user may login to an account with the merchant database proprietor 146 and/or may register to create an account with the merchant database proprietor 146. In either case, the example app 116 transmits merchant account information 148 (e.g., a login name or other account identifier, a password, etc.) to the merchant database proprietor 146, which identifies the user or account to the merchant database proprietor 146.

In addition to the merchant account information 148, the example app 116 accesses the device/user identifier 124 in the mobile device 106. The app 116 of the illustrated example transmits the device/user identifier 124 to the merchant database proprietor 146.

Upon receipt of the merchant account information 148 and the device/user identifier 124 and authentication of the corresponding user account, the example merchant database proprietor 146 associates the user account with the device/user identifier 124. As a result, the example merchant database proprietor 146 can generate transaction information 150 for the user account, including transactions performed using the user account with the device/user identifier 124.

In some cases, a user account is accessed via multiple devices (e.g., a smartphone and a tablet computer that are both owned by the owner of the user account). The example merchant database proprietor 146 may associate multiple device/user identifiers 124 with the user account such that media impressions occurring on any of the devices corresponding to the device/user identifiers 124 may be correlated to transactions occurring using the user account. The transactions may be independent of the device on which they were performed by the user. That is, in the illustrated example, transactions are associated with the user account.

As mentioned above, the example AME 108 receives the impression data 130 and the device/user identifier 124 from the example mobile device 106. The example AME 108 of FIG. 1 associates transaction information 150 with impression information by matching impressions to transactions using the device/user identifier 124. For example, the AME 108 of FIG. 1 receives, from the merchant database proprietor 146, transaction information associated with a user account associated with a device/user identifier 124 of the mobile device 106. The example AME 108 also receives the impression data 130 (or impression information) including an indication of the same device/user identifier 124. The example AME 108 of FIG. 1 correlates the transaction information to the impressions by matching the device/user identifier 124 in a transaction request 152 (described below) to the device/user identifier 124 that corresponds to a user account used to perform the transactions.

To obtain the transaction information, the example AME 108 transmits a transaction request 152 to the example merchant database proprietor 146. The example transaction request 152 includes a device/user identifier 124. The AME 108 transmits the device/user identifier 124 that is received in the impression data 130 to, for example, obtain transaction information to potentially be correlated to a media impression.

The example merchant database proprietor 146 receives the transaction request 152 including the device/user identifier 124. The merchant database proprietor 146 looks up a user account that was previously associated with the device/user identifier 124 (e.g., in a database). If the merchant database proprietor 146 locates a user account associated with the device/user identifier 124, the example merchant database proprietor 146 generates the transaction information 150 (e.g., based on transaction data stored in a database of the merchant database proprietor 146).

In the illustrated example, the merchant database proprietor 146 transmits the transaction information 150 to the example AME 108. In some examples, the merchant database proprietor 146 includes the device/user identifier 124 in its response to the AME 108 to enable the AME 108 to determine the device/user identifier 124 and/or the request 152 for which the transaction information 150 is being provided. The example AME 108 of the illustrated example matches the transaction information 150 received from the merchant database proprietor 146 to the impression data 130.

To match the impressions in the impression data 130 to the transactions in the transaction information 150, the example AME 108 of FIG. 1 determines the product(s) represented in the impression data 130. Examples of product(s) represented in media include products represented in advertisements for those products (e.g., a Coca-Cola® soft drink represented in an advertisement for Coca-Cola) and/or intentionally-placed product(s) in non-advertisement media such as television episodes, movies, and/or other content-oriented media (e.g., a Rolex® watch worn by an actor in a television show, a particular car brand used in a movie, etc.). For example, the AME 108 may access a database that specifies the products represented in each item of media 118. Similarly, the example transaction information 150 of FIG. 1 provided by the merchant database proprietor 146 includes an identification of the product(s) purchased in the transactions made by the user account associated with the device/user identifier 124.

The example AME 108 compares the product(s) represented in the impression data 130 to the product(s) in the transaction information 150 to determine whether there are any matching product(s). If the AME 108 identifies a product represented in an impression that matches a product involved in a purchase transaction, the example AME 108 determines whether the purchase transaction occurred after the impression. For example, the impression data 130 includes time and date information indicating the time and date of the impression on the mobile device 106. Similarly, the transaction information 150 includes time and date information indicating the time and date of the transaction(s) represented in the transaction information 150. The AME 108 compares the time and date information for the media impression to the time and date information for the transaction to determine which of the media impression or the transaction occurred first.

When the AME 108 determines that the media impression occurred before the transaction (e.g., the time and date of the media impression occurred before the time and date of the transaction), the example AME 108 correlates the media impression to the purchase of the product(s) represented in the impression. The example AME 108 determines whether such a correlation occurred for the product(s) for multiple mobile devices 106 and/or user accounts. For example, the AME 108 determines a percentage of a set of mobile devices 106 and/or user accounts for which the media impression of a product occurred before the purchase transaction of that product. In some examples, the AME 108 determines percentages of sets of mobile device 106 for different publishers and/or different media to evaluate the effectiveness of publishers and/or media for influencing purchasing behavior of the product.

In some examples, the merchant database proprietor 146 provides transaction information 150 to the AME 108 for all transactions performed using a user account associated with the device/user identifier 124, for all transactions performed within a specified time period using the user account associated with the device/user identifier 124, and/or for specified type(s) of transaction(s) performed using a user account associated with the device/user identifier 124. In some other examples, the AME 108 determines the product(s) represented in the media impressions occurring at the mobile device 106, and transmits product information 154 to the merchant database proprietor 146 in the transaction request 152. Limiting the transaction request 152 to product(s) of interest may enhance the privacy of the users of the merchant database proprietor 146 by restricting the AME 108 to information about specific product(s).

In some examples, the AME 108 may transmit the product information 154 in the request 152 without transmitting the device/user identifier 124. In such examples, the merchant database proprietor 146 looks up the product information 154 to determine which user accounts have purchased the product identified in the product information 154. The example merchant database proprietor 146 may then return a list of device/user identifiers 124 that correspond to user accounts that have purchased the product identified in the product information 154. In some examples, the transactions returned in response to a transaction request 152 are limited to transactions occurring within a particular time period, such as a period of time designated in the request 152, a period of time determined based on the request 152, a predetermined time period, and/or a standard time period.

When the example merchant database proprietor 146 receives a transaction request 152 including the product information 154, the example merchant database proprietor 146 determines whether the product(s) specified in the product information 154 have been purchased in any transactions performed using the user account associated with the device/user identifier 124 specified in the transaction request 152. If the product(s) specified in the product information 154 have been purchased, the example merchant database proprietor 146 returns the transaction information 150 for the transactions in which the specified product(s) were purchased. For any product(s) not purchased using the user account, the example merchant database proprietor 146 does not respond or responds with an indication that those product(s) were not purchased using the user account. By requiring the AME 108 to specify the product information 154, the example AME 108 does not receive transaction information that is not relevant to media impressions occurring on the mobile device 106.

The example AME 108 of FIG. 1 aggregates transaction information and media impressions to measure effectiveness of the media corresponding to the media impressions. As explained in more detail below, the example AME 108 measures the effectiveness of an item of media by using the transaction information (collected as described above) to measure a change in purchases of a product represented in the item of media from a time period prior to the media impressions to a time period subsequent to the media impressions. In some examples, the AME 108 creates a measurement group that is determined to have been exposed to the item of media and compares the change to a purchase change in a control group. The control group is determined by the AME 108 to not have been exposed to the item of media, according to the impression information.

Examples that may be used to implement the system of FIG. 1 are disclosed in U.S. patent application Ser. No. 14/127,414, filed on Aug. 28, 2013, U.S. patent application Ser. No. 14/261,085, filed on Apr. 24, 2014, U.S. Provisional Patent Application Ser. No. 61/952,726, filed on Mar. 13, 2014, U.S. Provisional Patent Application Ser. No. 61/979,391, filed on Apr. 14, 2014, U.S. Provisional Patent Application Ser. No. 61/986,784, filed on Apr. 30, 2014, U.S. Provisional Patent Application Ser. No. 61/991,286, filed on May 9, 2014, and U.S. Provisional Patent Application Ser. No. 62/014,659, filed Jun. 19, 2014. The entireties of U.S. patent application Ser. Nos. 14/127,414, 14/261,085, U.S. Provisional Patent Application Ser. Nos. 61/952,726, 61/979,391, 61/986,784, 61/991,286, and 62/014,659 are incorporated by reference herein.

Figure 2:
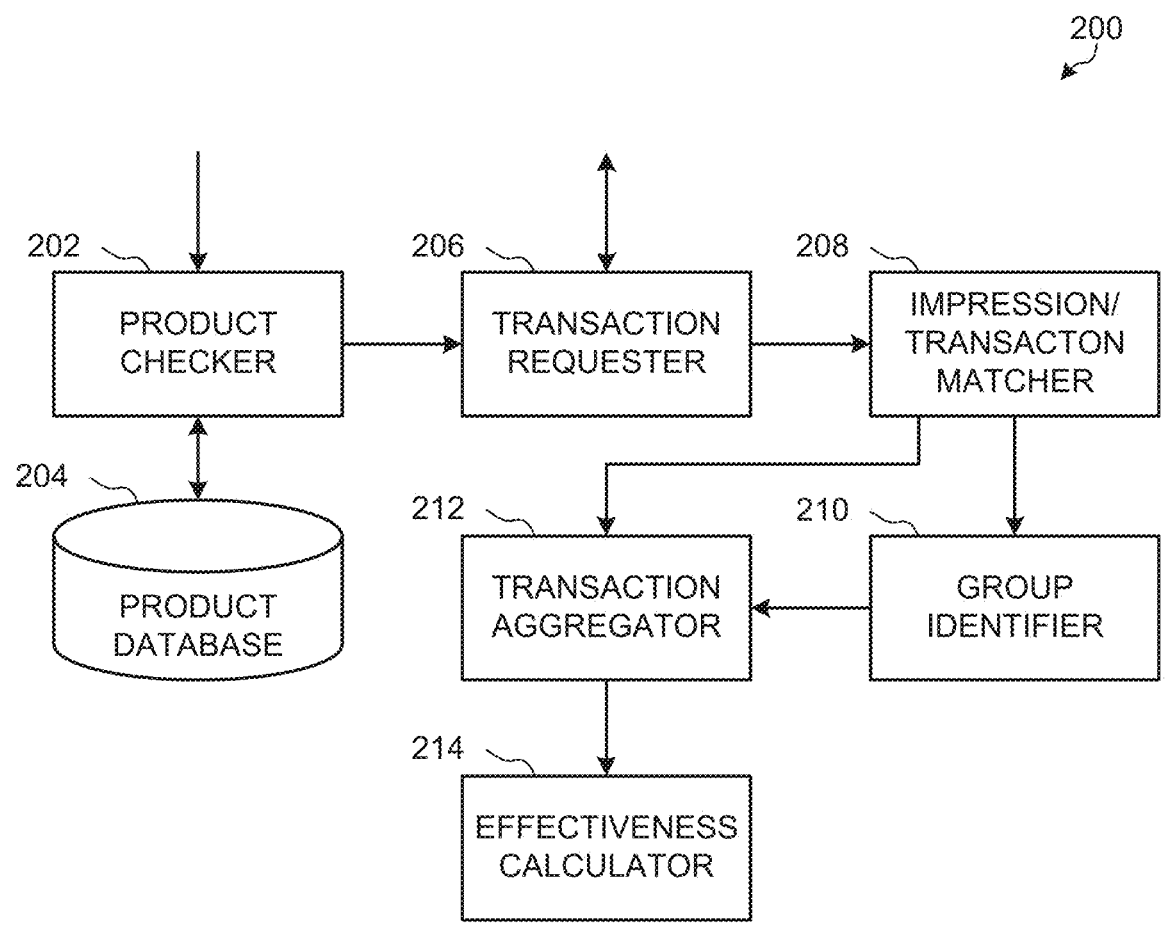
FIG. 2 is an example impression-transaction analyzer which may be implemented in the example audience measurement server of FIG. 1 to compare and/or match impression information associated with a mobile device to transaction information performed using a user account accessed by the mobile device.

FIG. 2 illustrates an example impression-transaction analyzer 200 which may be implemented in the example audience measurement server 132 of FIG. 1 to match impression information associated with a mobile device (e.g., the mobile device 106 of FIG. 1) to transaction information corresponding to a purchase made using a user account accessed by the mobile device 106. The example impression-transaction analyzer 200 of FIG. 2 includes an example product checker 202, an example product database 204, an example transaction requester 206, an example impression/transaction matcher 208, an example group identifier 210, an example transaction aggregator 212, and an example effectiveness calculator 214.

The example product checker 202 of FIG. 2 identifies products associated with media impressions. For example, the product checker 202 of the illustrated example receives impression data from mobile devices (e.g., the impression data 130 from the mobile device 106 of FIG. 1). In this example, the impression data 130 includes a media identifier 122 for media 118 corresponding to an impression occurring at the mobile device 106. The example product checker 202 queries the product database 204, which stores indications of products represented in the media 118 that corresponds to the media identifier 122. The product checker 202 of the illustrated example looks up a product corresponding to the media 118 in the product database 204 using the media identifier 122 as a key. In response to the query, the example product database 204 returns a product identifier of a product (e.g., the product information 154 of FIG. 1) to the example product checker 202. Over time, the example product database 204 may be updated with new associations of media to products. In the illustrated example product database 204, a media item may be associated with multiple products and/or a product may be represented by multiple media items.

In addition to the media identifier 122, the example impression data 130 also includes the device/user identifier 124. In the illustrated example, the example product checker 202 provides the device/user identifier 124 and the product information 154 corresponding to the transaction request 152 to the transaction requester 206.

The example transaction requester 206 of FIG. 2 generates and sends a transaction request 152 to one or more merchant database proprietors (e.g., the merchant database proprietor 146 of FIG. 1). In the example of FIG. 2, the transaction request 152 includes the device/user identifier 124 and the product information 154. The example transaction requester 206 sends the transaction request 152 to the merchant database proprietor 146 to obtain transaction information from the merchant database proprietor 146.

If the merchant database proprietor 146 has transaction information 150 corresponding to the device/user identifier 124, the example merchant database proprietor 146 sends the transaction information 150 to the impression-transaction analyzer 200. In some examples, the merchant database proprietor 146 limits the transaction information 150 that is returned to transactions that correspond to both the device/user identifier 124 and the product information 154. In other examples, the returned information is not so limited and/or the product information 154 is not provided to the merchant database proprietor 146.

The example transaction requester 206 of FIG. 2 receives the transaction information 150 from the merchant database proprietor 146 (e.g., in response to the transaction request 152) and provides the transaction information 150 and the impression data 130 to the impression/transaction matcher 208. The example impression/transaction matcher 208 of FIG. 2 matches impressions occurring at the mobile device 106 (e.g., from the impression data 130) to transactions of purchases performed using a user account associated with the mobile device 106 (e.g., from the transaction information 150). By matching the impressions to the transactions, the example impression/transaction matcher 208 may determine instances in which an impression corresponding to a product occurred prior to a transaction in which the product was purchased, where both the impression and the transaction correspond to a same device/user identifier 124. This information can be used to credit the impression with driving the transaction.

To match an impression to a transaction, the example impression/transaction matcher 208 compares A) combinations of a device/user identifier 124 and product information 154 that are obtained from the impression data 130 to B) combinations of a device/user identifier 124 and product information 154 that correspond to transaction information 150 obtained from the merchant database proprietor 146. Combinations of the device/user identifier 124 and the product information 154 that are found in both the impression data 130 and in the transaction information 150 are considered to match.

As an example, Table 1 below includes a set of example combinations of device/user identifiers 124 (e.g., Device/User ID) and product information 154 (e.g., Product ID) obtained from impression data 130 (e.g., Impression ID) (e.g., by the example product checker 202) collected at a mobile device 106.

TABLE 1

EXAMPLE COMBINATIONS OF DEVICE/USER IDENTIFIERS AND PRODUCT IDENTIFIERS FROM IMPRESSION DATA

| Impression ID | Device/User ID | Product ID | Imp. Time/Date |
|---|---|---|---|
| 11 | HOI35JGETR | R9ANT20EJY | 2014-07-08:09:15:00 |
| 12 | HOI35JGETR | 7ZFF46F77Z | 2014-07-08:13:05:00 |
| 13 | B8PE8JH26N | NB2EYZ4YOG | 2014-07-08:16:10:00 |

Table 2 below includes a set of example combinations of device/user identifiers 124 (e.g., Device/User ID) and product information 154 (e.g., Product ID) corresponding to transaction information 150 (e.g., Transaction ID) received by the transaction requester 206 from a merchant database proprietor 146. The combinations in Table 2 may be returned in the transaction information 150 from a merchant database proprietor 146 and/or may be associated with the transaction information 150 by the transaction requester 206 when the transaction information 150 is identified as occurring in response to a transaction request 152.

TABLE 2

EXAMPLE COMBINATIONS OF DEVICE/USER IDENTIFIERS AND PRODUCT IDENTIFIERS FROM TRANSACTION DATA

| Transaction ID | Device/User ID | Product ID | Trans. Time/Date |
|---|---|---|---|
| 21 | HOI35JGETR | R9ANT20EJY | 2014-07-09:19:12:00 |
| 22 | HOI35JGETR | I9DBW9RC8R | 2014-07-09:19:12:00 |
| 23 | OBU2434KTL | R9ANT20EJY | 2014-07-08:11:49:00 |
| 24 | B8PE8JH26N | NB2EYZ4YOG | 2014-07-07:04:42:00 |

By comparing the combinations in Table 1 above (e.g., records, impressions) to the combinations in Table 2 above (e.g., records, transactions), in this example the example impression/transaction matcher 208 of FIG. 2 will identify the impression data 130 having impression ID 11 as having the same combination of device/user identifier 124 (e.g., Device/User ID of HOI35JGETR) and product information 154 (e.g., Product ID of R9ANT20EJY) as transaction information 150 having transaction ID 21. In this example, the impression/transaction matcher 208 of FIG. 2 also identifies the impression data 130 having impression ID 13 in Table 1 above as having the same combination of device/user identifier 124 (e.g., Device/User ID of B8PE8JH26N) and product information 154 (e.g., Product ID of NB2EYZ4YOG) as transaction information 150 having transaction ID 24.

While Table 1 above shows that additional impressions data 130 associated with the device/user identifier 124 of HOI35JGETR (Device/User ID) was received (e.g., data with an impression ID of 12), there are no corresponding transactions in Table 2 above for that device/user identifier 124 that are also associated with the product having a Product ID of 7ZFF46F77Z (i.e., the Product ID associated with impression ID 12). Therefore, the impression/transaction matcher 208 does not identify a match for impression ID 12.

Similarly, Table 2 above shows that the device/user ID HOI35JGETR was used to perform a transaction for the purchase of a product having a Product ID of I9DBW9RC8R (see transaction ID 22 in Table 2). However, Table 1 does not indicate that an impression of media representing that product (i.e., I9DBW9RC8R) occurred on a mobile device 106 that corresponds to the device/user ID HOI35JGETR. Therefore, the impression/transaction matcher 208 of this example does not identify a match for transaction ID 22.

The example Table 1 above also includes information indicating the times and dates at which the impressions occurred (Imp. Time/Date). The example Table 2 above also includes information indicating the times and dates at which the transactions occurred. When the example impression/transaction matcher 208 of FIG. 2 identifies a transaction (e.g., from Table 2 above) that has a device/user identifier 124 and product information 154 combination that matches the device/user identifier 124 and product information 154 combination of an impression (e.g., from Table 1 above), the impression/transaction matcher 208 of the illustrated example determines whether the impression occurred prior to the transaction based on the respective times and dates of the matching impression ID and transaction ID. In the example of FIG. 2, the impression/transaction matcher 208 determines that the matching impression and transaction are related (e.g., that the impression may have resulted in the transaction) when the impression occurred prior to the transaction (according to the respective times and dates).

In the example of Tables 1 and 2 above, the impression/transaction matcher 208 would determine that the impression having impression ID 11 is related to the matching transaction having transaction ID 21 because the impression has a time and date (Jul. 8, 2014, at 09:15:00) that occurred before the time and date of the transaction (Jul. 9, 2014, at 19:12:00). For example, where the media associated with the impression having impression ID 11 is an advertisement for a product, and the transaction corresponding to transaction ID 21 is a subsequent purchase of that product using a user account associated with the device on which the impression occurred, it is possible or even likely that the impression had an influence on the purchase of the product. Therefore, in view of the time sequence of this example (i.e., the impression occurring before the transaction), the impression is credited with driving the transaction.

Conversely, in the example of Tables 1 and 2 above, the impression/transaction matcher 208 would determine that the impression having impression ID 13 is not related to the matching transaction having transaction ID 24 because the impression has a time and date (Jul. 8, 2014, at 16:10:00)

that occurred after the time and date of the transaction (Jul. 7, 2014, at 04:42:00). For example, where a person purchases a product and then is subsequently exposed to an advertisement for the product, that particular exposure of the person to the advertisement would not be considered to have influenced the prior purchase of that product and, thus, is not credited with driving a transaction.

The example group identifier 210 of FIG. 2 assigns device/user identifiers 124 to groups based on whether the device/user identifier 124 is associated with an impression of media of interest (e.g., media corresponding to a product of interest). For example, the group identifier 210 of FIG. 2 assigns device/user identifiers 124 that correspond to impressions of the media to an "exposed" group, and assigns device/user identifiers 124 that do not correspond to the media of interest to a "control" group. In some examples, the group identifier 210 further sub-divides the control group and/or the exposed group based on other factors such as time periods during which the impressions of the media of interest occurred for the exposed group.

The example impression/transaction matcher 208 of FIG. 2 provides the group identifier 210 of FIG. 2 with the impression information (e.g., the impression information of Table 1). The example group identifier 210 determines, for each device/user identifier 124 represented in the impressions, whether the device/user identifier 124 has been exposed to media representing a product of interest. For example, the group identifier 210 is provided with product information 154 for a product of interest, such as a product for which a media campaign is to be evaluated for effectiveness.

In some examples, the group identifier 210 is provided with a media identifier 122 instead of product information 154. A media identifier 122 may be used when, for example, a measurement of the effectiveness of a particular item of media is desired when there are multiple items of media representing a product. In such examples, the group identifier 210 may obtain impression data 130 from the product checker 202. Using the impression data 130, the group identifier 210 determines the device/user identifiers 124 corresponding to impressions of the media 118 having the media identifier 122.

The example group identifier 210 of FIG. 2 sorts the device/user identifiers 124 (e.g., device/user IDs of Tables 1 and/or 2 above) into two groups. The first group is an "exposed group," which includes the device/identifiers 124 corresponding to impressions of media representing the product of interest. For example, the group identifier 210 may populate a table or other data structure corresponding to the exposed group with device/user identifiers 124 that are present in combination with the product ID of interest in an impressions table (e.g., Table 1 above). The second group is a "control group," which includes the device/identifiers 124 for which impressions of media representing the product of interest did not occur. Using the example Table 1 above, if the group identifier 210 receives the Product ID R9ANT20EJY as the product of interest, the example group identifier 210 would place the device/user identifier 124 (device/user ID) of HOI35JGETR in the exposed group because the device/user identifier 124 of HOI35JGETR reported an impression of media corresponding to Product ID R9ANT20EJY. In this example, the group identifier 210 would place the device/user identifier 124 (device/user ID) of B8PE8JH26N in a table or other data structure corresponding to the control group because the device/user identifier 124 of B8PE8JH26N did not report an impression of media corresponding to Product ID R9ANT20EJY. Therefore, in this example, the exposed group would have a count of one device/user identifier 124 and the control group would have a count of one device/user identifier 124.

The example impression/transaction matcher 208 of FIG. 2 provides the transactions (e.g., the transactions of Table 2 above) to the transaction aggregator 212. Additionally, the example group identifier 210 provides the list of device/user identifiers 124 that belong to each of the groups (e.g., the control group and the exposed group) to the transaction aggregator 212. For example, the group identifier 210 may provide a first list of device/user identifiers 124 that have been determined to be in the control group and a second list of device/user identifiers 124 that have been determined to be in the exposed group. These lists correspond to the data structure for the exposed group and the control group mentioned above.

The example transaction aggregator 212 of FIG. 2 determines up to four separate sets of purchases or transactions based on the transactions obtained from the impression/transaction matcher 208 and based on the groups identified by the group identifier 210. In the illustrated example, the transaction aggregator 212 determines 1) the number of the products purchased by user accounts corresponding to device/user identifiers 124 in the control group during a first time period; 2) the number of the products purchased by user accounts corresponding to device/user identifiers 124 in the control group during a second time period occurring after the first time period; 3) the number of the products purchased by user accounts corresponding to device/user identifiers 124 in the exposed group during the first time period; and 4) the number of the products purchased by user accounts corresponding to device/user identifiers 124 in the exposed group during the second time period.

In the illustrated example, the first time period is a time period prior to (e.g., ending at) the commencement of a media campaign including media (e.g., the media of interest) representing the products of interest. Thus, the purchases of the products by the control group and the exposed group may provide a basis for calculating purchase growth attributable to the media. In particular, differences in purchases or purchase rate by the exposed group as compared to the purchases or purchase rate of the control group provides a measure of the effectiveness of the media in driving and/or slowing sales.

In the illustrated example, the second time period is a time period subsequent to (e.g., starting at the end of or consecutive to) the first period. For example, the second time period may begin at the end of the first time period, the end of a time period during which a media campaign runs, and/or at any other event.

To determine the number of the products purchased via user accounts corresponding to device/user identifiers 124 in the control group during a first time period (e.g., the first example set of purchases determined by the transaction aggregator 212), the example transaction aggregator 212 identifies transactions (e.g., transactions from Table 2 above) that have a time and date within the first period and have a device/user identifier 124 assigned to the control group by the group identifier 210. The control group will not have a matching impression (e.g., in Table 1). In other words, to determine the number of the products purchased via user accounts corresponding to device/user identifiers 124 in the control group during the first time period, the example transaction aggregator 212 determines a number of transactions performed using devices corresponding to the control group prior to, for example, the beginning of a media campaign (e.g., a coordinated set of impressions of one or more media items, including audio, video, and/or still media) for the product of interest.

To determine the number of the products purchased via user accounts corresponding to device/user identifiers 124 in the control group during a second time period (e.g., the second example set of purchases determined by the transaction aggregator 212), the example transaction aggregator 212 identifies transactions (e.g., transactions from Table 2 above) that: 1) have a time and date within the second period and have a device/user identifier 124 assigned to the control group by the group identifier 210. The control group will not have a matching impression (e.g., in Table 1). In other words, to determine the number of the products purchased via user accounts corresponding to device/user identifiers 124 assigned to the control group during the second time period, the example transaction aggregator 212 determines a number of transactions performed using devices corresponding to the control group after the beginning of the media campaign (e.g., during and/or after the media campaign) for the product of interest.

To determine the number of the products purchased via user accounts corresponding to device/user identifiers 124 in the exposed group during the first time period (e.g., the third example set of purchases determined by the transaction aggregator 212), the example transaction aggregator 212 identifies transactions (e.g., transactions from Table 2 above) that have a time and date within the first period and have a device/user identifier 124 assigned to the exposed group by the group identifier 210. In other words, to determine the number of the products purchased via user accounts corresponding to device/user identifiers 124 assigned to the exposed group during the first time period, the example transaction aggregator 212 determines a number of transactions performed using devices corresponding to the exposed group prior to the beginning of the media campaign for the product of interest.

To determine the number of the products purchased via user accounts corresponding to device/user identifiers 124 in the exposed group during the second time period (e.g., the fourth example set of purchases determined by the transaction aggregator 212), the example transaction aggregator 212 identifies transactions (e.g., transactions from Table 2 above) that: 1) have a time and date within the second period and have a device/user identifier 124 assigned to the exposed group, and 2) have a related matching impression (e.g., an impression in Table 1 above that has a same device/user ID and a same Product ID as the transaction, and where the impression has a time and date that is prior to the time and date of the transaction). In other words, to determine the number of the products purchased via user accounts corresponding to device/user identifiers 124 in the exposed group during the second time period, the example transaction aggregator 212 determines a number of transactions performed using devices corresponding to the exposed group after the beginning of the media campaign for the product of interest.

The example effectiveness calculator 214 of FIG. 2 calculates the effectiveness of the media and/or the effectiveness of the publishers (e.g., the delivery methods for the media). For example, the effectiveness calculator 214 calculates the effectiveness of the media and/or the publishers based on the sales of the product represented in the media that occurred in the aggregated transactions. The example effectiveness calculator 214 calculates the sales using the sets of purchases determined by the transaction aggregator 212 for the control and exposed groups during the first and second time periods.

In some examples, the effectiveness calculator 214 calculates a publisher effectiveness (e.g., for an app publisher 110, for a media publisher 120, etc.) by, for example, dividing the sales lift in an exposed group for a first publisher by the sales lift in an exposed group for a second publisher. The exposed group for the first publisher is the fourth example group calculated by the transaction aggregator 212 as described above (e.g., the number of the products purchased via user accounts corresponding to device/user identifiers 124 in the exposed group during the second time period) determined using device/user identifiers 124 associated with impressions delivered via the first publisher (e.g., delivered via an app and/or a website associated with the app publisher 110, delivered in association with media published by the media publisher 120, etc.). Similarly, the exposed group for the second publisher is the fourth example group calculated by the transaction aggregator 212 as described above (e.g., the number of the products purchased via user accounts corresponding to device/user identifiers 124 in the exposed group during the second time period) determined using device/user identifiers 124 associated with impressions delivered via the second publisher (e.g., delivered via an app and/or a website associated with the app publisher 110, delivered in association with media published by the media publisher 120, etc.).

Additionally or alternatively, the example effectiveness calculator 214 calculates the effectiveness of media by, for example, dividing a sales lift from the first time period to the second time period for an exposed group by the sales lift from the first time period to the second time period for a control group. The media effectiveness measures, for example, the effect of the media of interest on driving sales by determining the difference in sales rates after the media of interest was presented relative to sales rates before the media was presented. For example, the effectiveness calculator 214 may determine the media effectiveness metric using the four example sets of purchases determined by the transaction aggregator 212 as described above to be: ((sales in fourth example set of purchases/sales in third example set of purchases)/(sales in second example set of purchases/sales in first example set of purchases)) or ((sales in fourth example set of purchases/sales in third example set of purchases)−(sales in second example set of purchases/sales in first example set of purchases)/(sales in second example set of purchases/sales in first example set of purchases)).

Figures 3, 4:
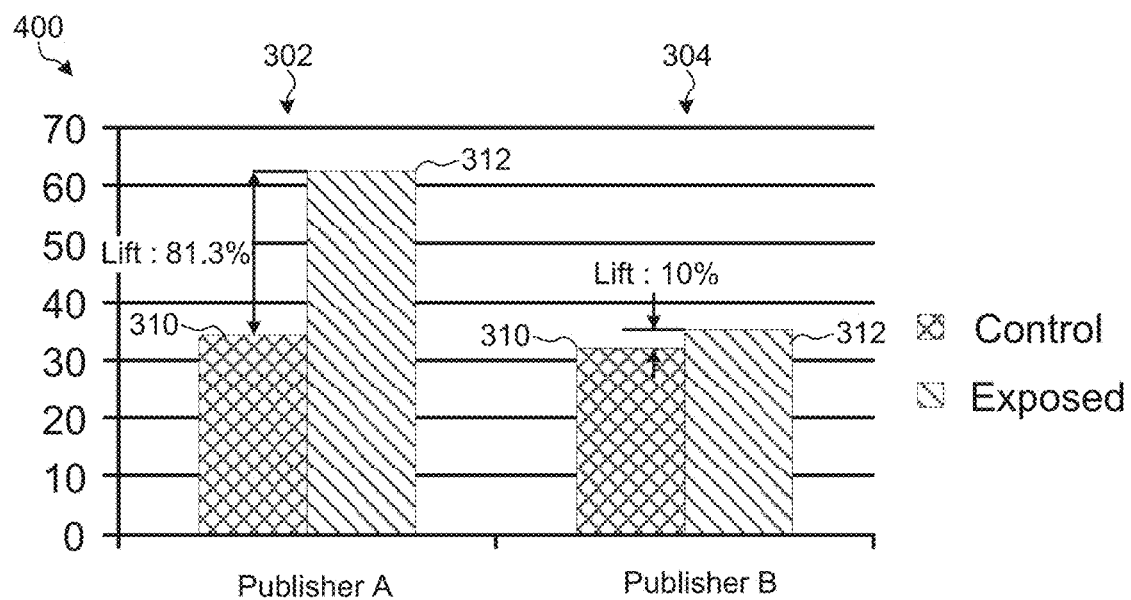
FIG. 3 illustrates an example table illustrating an example determination of publisher effectiveness.
FIG. 4 is a graph illustrating the data in the example table of FIG. 3.

FIG. 3 illustrates an example table 300 illustrating an example determination of an effectiveness of media impressions. FIG. 4 is a graph 400 illustrating the data in the example table 300 of FIG. 3. The example table 300 and/or the example graph 400 may be generated by the example impression-transaction analyzer 200 of FIG. 2 based on impression data 130 obtained from the mobile device 106, user information 102 obtained from the example demographic database proprietor 104, and/or transaction information 150 obtained from the merchant database proprietor 146 of FIG. 1.

In the examples of FIGS. 3 and 4, the impression-transaction analyzer 200 does not calculate the transactions occurring prior to the media impressions (as in the examples described above with reference to FIG. 2). Instead, in this example the media effectiveness is determined by comparing sales of the product to the control group with sales of the product to the exposed group to determine a sales lift. Omitting the measurement of different time periods increases the privacy of users of the merchant database proprietor 146 and decreases computational resource requirements, but may also fail to control the measurement for external events, such as media impressions occurring via other media presentation platforms such as television, radio, and/or outdoor advertising.

The example table 300 of FIG. 3 illustrates a comparison of transactions for a product corresponding to impressions delivered through two different mobile application publishers (e.g., via two different applications that may be installed on a mobile device). For this example, assume Publisher A 302 publishes a first application (e.g., the app 116 of FIG. 1) and Publisher B 304 publishes a second application (e.g., the browser 117 of FIG. 1). The example media publisher 120 of FIG. 1 may choose to have the media 118 of FIG. 1 delivered to the mobile device 106 via either or both of the app 116 and/or the browser 117 of FIG. 1.

For each of the publishers 302, 304 of the example table 300 of FIG. 3, the example group identifier 210 of FIG. 2 determines a number of user accounts (or persons associated with the user accounts) belonging to the control group 306 as described above (e.g., during a time period following the commencement of media impressions at mobile devices 106 via the publishers 302, 304). The group identifier 210 also determines a number of user accounts belonging to the exposed group 308 as described above.

In the example of FIGS. 3 and 4, the group identifier 210 identifies (e.g., based on the impression data 130 from those mobile devices 106) 12,200 user accounts in the control group for publisher A 302 (e.g., associated with mobile devices 106 using the app 116 from the publisher A 302 that have not had an impression of the media). Similarly, the group identifier 210 identifies (e.g., based on the impression data 130 from those mobile devices 106) 17,500 user accounts in the control group for publisher B 304 (e.g., associated with mobile devices 106 using the browser 117 from the publisher B 304 that have not had an impression of the media).

Continuing the example, the group identifier 210 identifies (e.g., based on the impression data 130 from those mobile devices 106) 35,400 user accounts in the exposed group for publisher A 302 (e.g., associated with mobile devices 106 using the app 116 from the publisher A 302 that have had an impression of the media). Similarly, the group identifier 210 identifies (e.g., based on the impression data 130 from those mobile devices 106) 30,100 user accounts in the exposed group for publisher B 304 (e.g., associated with mobile devices 106 using the browser 117 from the publisher B 304 that have had an impression of the media).

The example transaction aggregator 212 of FIG. 2 determines a number of control group sales 310 (e.g., transactions involving the product, of a quantity of units of the product, etc.) and a number of exposed group sales 312 of the respective control groups of the example publishers 302, 304. The example control group sales 310 may be the first or the second example groups of purchases determined by the transaction aggregator 212 as described above. The example exposed group sales 312 may be the third or the fourth example groups of purchases determined by the transaction aggregator 212 as described above. The transaction aggregator 212 determines a number of transactions for the product corresponding to the members of each of the groups 306, 308 identified by the group identifier 210. In the example of FIGS. 3 and 4, Publisher A 302 is determined to have 4,200 control group sales 310 and 22,100 exposed group sales 312 of the example product. Therefore, 34.4% (e.g., 4,200/12,200) of the example control group 306 of the publisher A 302 purchased the example product of interest during the measured time period, while 62.4% (e.g., 22,100/35,400) of the exposed group 308 of the publisher A 302 purchased the example product during the measured time period. Therefore, the media impressions delivered via the app 116 (e.g., via Publisher A) resulted in a sales lift 314 of 81.3% (e.g., (62.4%−34.4%)/34.4%) for the product in the exposed group 308 relative to the control group 306.

Publisher B 304 is determined to have 5,600 control group sales 310 and 10,600 exposed group sales 312 of the example product. Therefore, 32% (e.g., 5,600/17,500) of the example control group 306 of the publisher B 304 purchased the example product of interest during the measured time period, while 35.2% (e.g., 10,600/30,100)) of the exposed group 308 of the publisher B 304 purchased the example product during the measured time period. Therefore, the media impressions delivered via the browser 117 (e.g., via Publisher B) resulted in a sales lift 314 of 10.0% (e.g., (35.2%−32%)/32%) for the product in the exposed group 308 relative to the control group 306.

By comparing the example sales lifts 314 for the publishers 302, 304 of FIGS. 3 and 4, a manufacturer of a product associated with the media of interest (or, for example, the manufacturer's advertising agent) may determine that impressions of the media corresponding to the product are more effective when occurring through the app 116 (e.g., via Publisher A 302) than through the browser 117 (e.g., via Publisher B 304) (or, in some other examples, more effective through a first app than through a second app). The example manufacturer (and/or its advertising agent) may respond to this determination by channeling more of the media impressions to mobile devices 106 via the app 116 (provided by Publisher A 302) and fewer via the browser 117 (provided by Publisher B 304). Additionally or alternatively, the manufacturer (and/or its advertising agent) replace the browser 117 with another app (e.g., via Publisher C) for delivery of media impressions to mobile devices. For example, the replacement app (e.g., Publisher C) may be selected to be one that has substantially similar or identical lift performance as the app provided by Publisher A 302 of FIG. 3.

Figure 5:
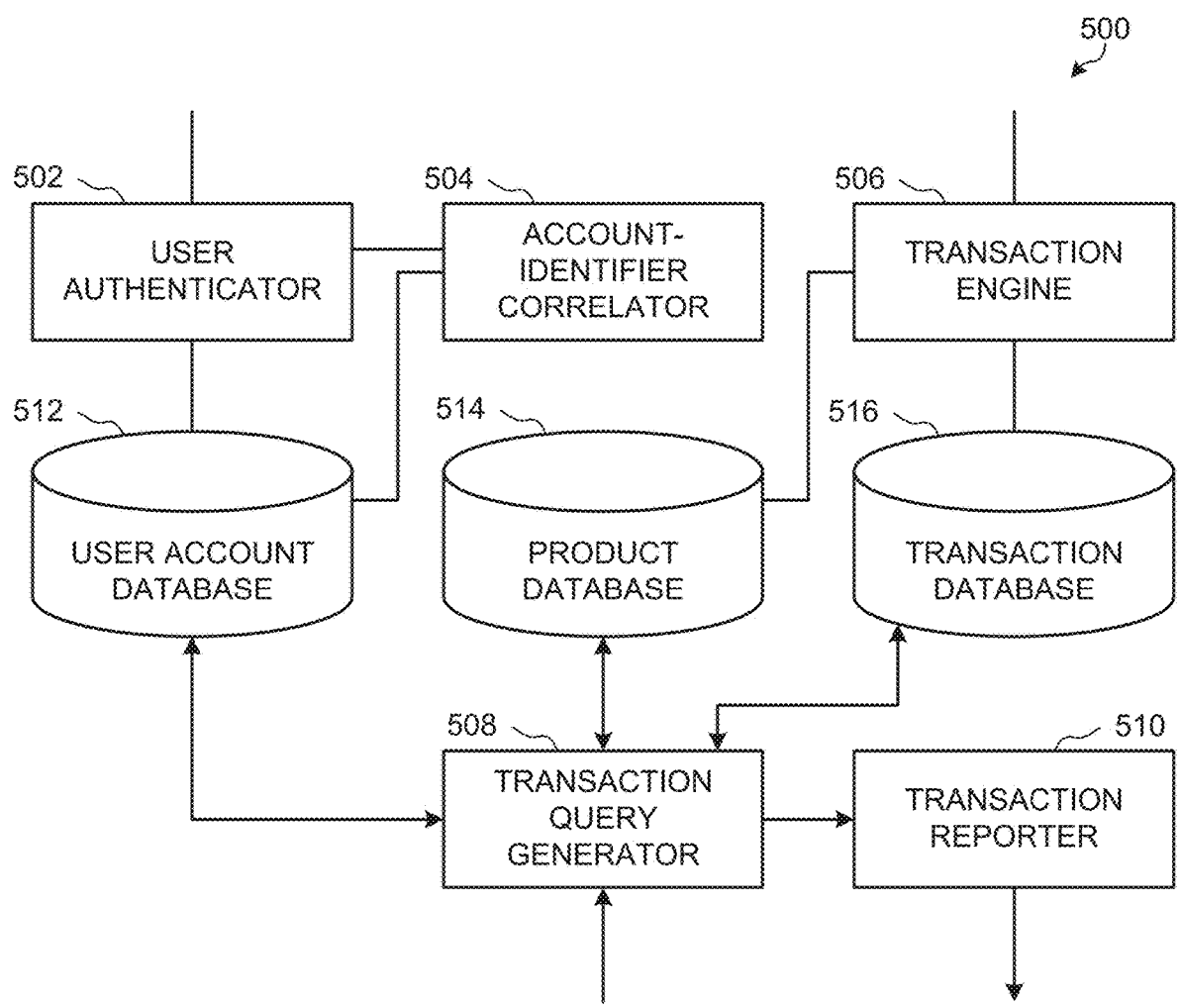
FIG. 5 is a block diagram of an example transaction information provider that may be used to implement the example merchant database proprietor of FIG. 1.

FIG. 5 is a block diagram of an example transaction information provider 500 that may be used to implement the example merchant database proprietor 146 of FIG. 1. The example transaction information provider 500 includes an example user authenticator 502, an example account-identifier correlator 504, an example transaction engine 506, an example transaction query generator 508, and an example transaction reporter 510. The example transaction information provider 500 further includes databases including an example user account database 512, an example product database 514, and an example transaction database 516.

The example user authenticator 502 of FIG. 5 receives user login requests (e.g., from the mobile device 106, the app 116 of FIG. 1). In the example of FIG. 5, the user login requests include the example merchant account information 148 of FIG. 1. The merchant account information 148 may include a unique account identifier (e.g., a user name, an account number, etc.) and one or more authenticators (e.g., passwords, pass codes, authentication keys, etc.). In the illustrated example, the example user authenticator 502 verifies the merchant account information 148 (e.g., the account identifier and/or the authenticator(s)) in the user account database 512, which stores the merchant account information 148 for authentication purposes.

As mentioned above with reference to FIG. 1, the example user login request that is authenticated by the user authenticator 502 also includes a device/user identifier 124 corresponding to the mobile device 106 (e.g., the device/user identifier 124 of FIG. 1). In the example of FIG. 5, the device/user identifier 124 is an identifier (e.g., an IMEI number, an IDFA number, etc.) that is not set by either of the merchant database proprietor 146 of FIG. 1 or the transaction information provider 500 of FIG. 5. Because the device/user identifier 124 is not set by the transaction information provider 500, the transaction information provider 500 is required to obtain the device/user identifier 124 from the mobile device 106.

The example account-identifier correlator 504 of FIG. 5 matches the merchant account information 148 to the device/user identifier 124 included in the request. For example, the account-identifier correlator 504 stores the device/user identifier 124 in the user account database 512 in association with the merchant account information 148 so that the device/user identifier 124 is associated with the user account at the merchant. Because a user may log in to the merchant database proprietor 146 from multiple devices, the example account-identifier correlator 504 may correlate multiple device/user identifiers 504 to the same merchant account information 148 (e.g., to a same user account).

The example transaction engine 506 enables users to conduct transactions, such as purchasing products from the merchant database proprietor 146 (e.g., an organization such as a commercial merchant). When a user (e.g., a user having a user account with the merchant database proprietor 146) purchases a product via the transaction engine 506, the example transaction engine 506 accesses the product database 514 to determine product identifier(s) of the product(s) and/or service(s) purchased in the transaction. The example transaction engine 506 stores transaction information (e.g., the transaction information 150 of FIG. 1) in the transaction database 516. The stored transaction information may include, for example, the product identifiers involved in the transaction, the time and/or date of the transaction, and the user account associated with the transaction. As discussed below, the device/user identifiers 124 from the mobile device 106 may then be matched to the transactions in the transaction database 516 based on the mapping of user accounts to the device/user identifier 124 in the user account database 512.

The example product database 514 may store the same information as the product database 204 of FIG. 2. In some examples, the product database 204 of FIG. 2 includes a subset of the product identifiers included in the product database 514 of FIG. 5 (e.g., when the product database 204 of FIG. 2 includes product identifiers only for products of interest to the audience measurement entity 108). In some other examples, the product database 514 of FIG. 5 includes a subset of the product identifiers included in the product database 204 of FIG. 2 (e.g., when there are multiple merchant database proprietors 146 having different products for purchase).

The example transaction query generator 508 of FIG. 5 receives requests for transaction information (e.g., from the audience measurement entity 108 of FIG. 1). For example, the transaction query generator 508 may receive a request 152 for transactions that have been performed using an account corresponding to the device/user identifier 124 and that include product information 154.

Upon receipt of such a request 152, the example transaction query generator 508 queries the user account database 512 to determine a user account (e.g., an account identifier, a user name, etc.) that corresponds to the device/user identifier 124 in the request 152. The example user account database 512 determines the user account that matches the device/user identifier 124 (e.g., the account previously correlated to the device/user identifier 124 by the account-identifier correlator 504). The user account database 512 returns the account identifier to the example transaction query generator 508.

Using the account identifier, the example transaction query generator 508 queries the product database 514 using the product information 154 in the request 152 to determine a product identifier used by the transaction information provider 500 to identify the product (e.g., an internal reference number for the product that is used within the transaction information provider 500, a universal product code (UPC), an international article number (EAN), a global trade item number (GTIN), a bar code, etc.). For example, a UPC code uniquely identifies a trade item and/or a variant or specific configuration of a trade item, and may be used by the transaction information provider 500. The example transaction query generator 508 then queries the transaction database 516 using the account identifier (e.g., obtained by querying the user account database 512) and the product identifier (e.g., obtained by querying the product database 514) to identify transactions involving the product that were conducted using the specified account.

The transaction database 516 returns information describing the identified transactions, including the account identifier, the device identifiers, and the date and time of the transaction. The example transaction query generator 508 provides the transaction information returned from the transaction database to the transaction reporter 510. The example transaction reporter 510 of FIG. 5 returns transaction information 150 to the AME 108 of FIG. 1 (e.g., in response to a corresponding transaction request 152). In the example of FIG. 5, the transaction reporter 510 converts the information received from the transaction database 516 to information usable by the AME 108. For example, the transaction reporter 510 may convert an account identifier associated with a transaction in the transaction database 516 to a device/user identifier 124 recognizable by the AME 108 (e.g., to the device/user identifier 124 included in the transaction request 152 and obtained from the transaction query generator 508). Additionally or alternatively, the transaction reporter 510 may convert a product identifier (e.g., a UPC code, a service code, etc.) used by the transaction information provider 500 to corresponding product information 154 (e.g., the product information included in the transaction request 152 and obtained from the transaction query generator 508).

The example transaction reporter 510 of FIG. 5 sends the transaction information 150 to the example AME 108. The AME 108 receives the transaction information 150 and determines the effectiveness of media impressions as described above.

While example manners of implementing the example impression-transaction analyzer 200 and the transaction information provider have been illustrated in FIGS. 2 and 5, one or more of the elements, processes and/or devices illustrated in FIGS. 2 and 5 may be combined, divided, re-arranged, omitted, eliminated and/or implemented in any other way. Further, the example product checker 202, the example product database 204, the example transaction requester 206, the example impression/transaction matcher 208, the example group identifier 210, the example transaction aggregator 212, the example effectiveness calculator 214, the example user authenticator 502, the example account-identifier correlator 504, the example transaction engine 506, the example transaction query generator 508, the example transaction reporter 510, the example user account database 512, the example product database 514, the example transaction database 516 and/or, more generally, the example impression-transaction analyzer 200 of FIG. 2, and/or the example transaction information provider 500 of FIG. 5 may be implemented using hardware, software, firmware and/or any combination of hardware, software and/or firmware. Thus, for example, any of the example product checker 202, the example product database 204, the example transaction requester 206, the example impression/transaction matcher 208, the example group identifier 210, the example transaction aggregator 212, the example effectiveness calculator 214, the example user authenticator 502, the example account-identifier correlator 504, the example transaction engine 506, the example transaction query generator 508, the example transaction reporter 510, the example user account database 512, the example product database 514, the example transaction database and/or, more generally, the example impression-transaction analyzer 200, and/or the example transaction information provider 500 could be implemented using one or more analog or digital circuit(s), logical circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example product checker 202, the example product database 204, the example transaction requester 206, the example impression/transaction matcher 208, the example group identifier 210, the example transaction aggregator 212, the example effectiveness calculator 214, the example user authenticator 502, the example account-identifier correlator 504, the example transaction engine 506, the example transaction query generator 508, the example transaction reporter 510, the example user account database 512, the example product database 514, and/or the example transaction database 516 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example impression-transaction analyzer 200 of FIG. 2 and/or the example transaction information provider 500 of FIG. 5 may include one or more elements, processes and/or devices in addition to, or instead of, those illustrated in FIGS. 2 and/or 5, and/or may include more than one of any or all of the illustrated elements, processes and devices.

Flowcharts representative of example machine readable instructions for implementing the example audience measurement entity 108, the audience measurement server 132, and/or the example merchant database proprietor 146 of FIG. 1, the example impression-transaction analyzer 200 of FIG. 2, and/or the example transaction information provider 500 of FIG. 5 are shown in FIGS. 6-11. In these examples, the machine readable instructions comprise one or more programs for execution by a processor such as the processor 1212 shown in the example processor platform 1200 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor 1212, but the entire program(s) and/or parts thereof could alternatively be executed by a device other than the processor 1212 and/or embodied in firmware or dedicated hardware. Further, although the example one or more programs are described with reference to the flowcharts illustrated in FIGS. 6-11, many other methods of implementing the example impression data compensator 200 may alternatively be used. For example, the order of execution of the blocks may be changed, and/or some of the blocks described may be changed, eliminated, or combined.

As mentioned above, the example processes of FIGS. 6-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 6:
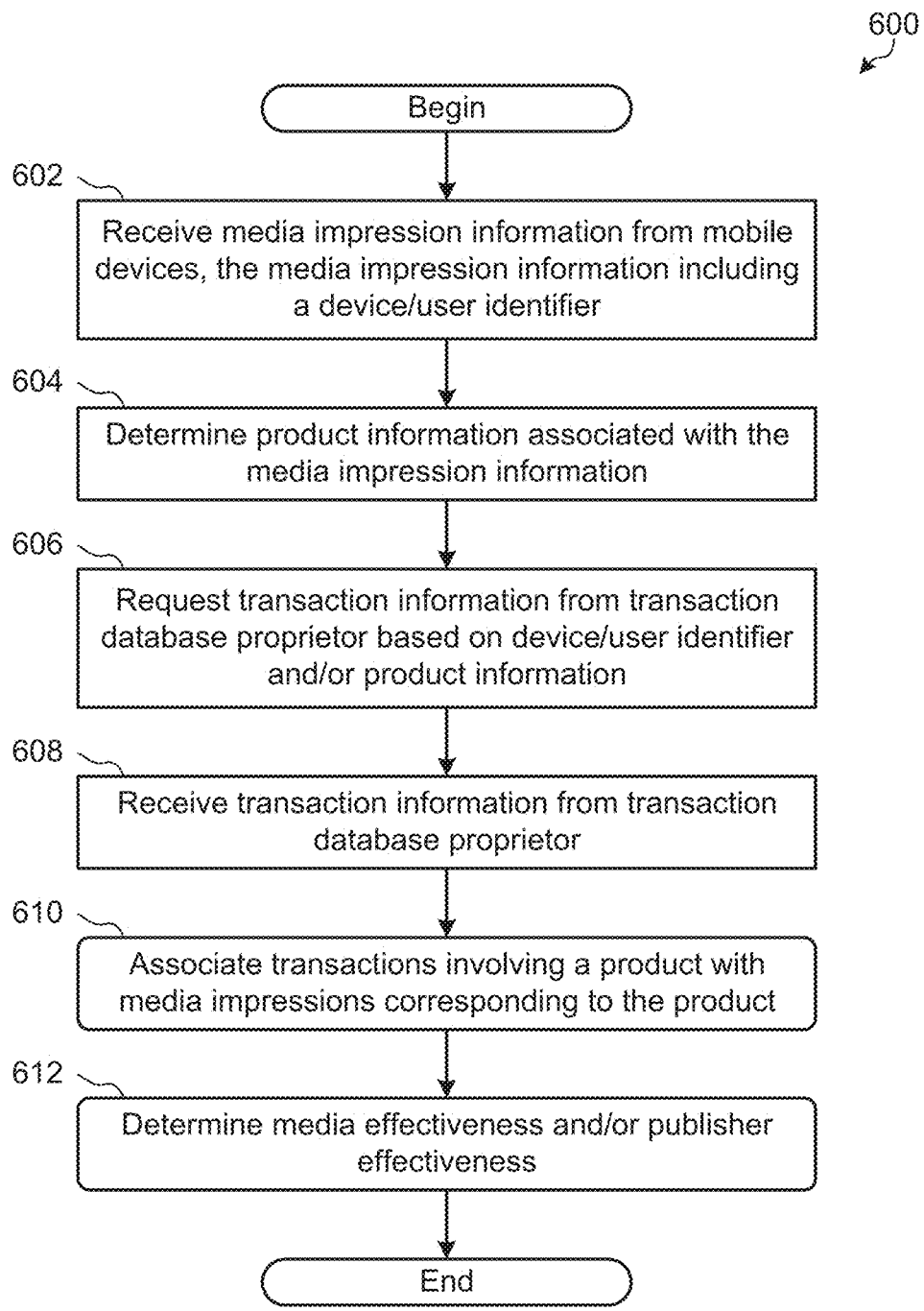
FIG. 6 is a flow diagram representative of example machine readable instructions which may be executed to implement the example impression-transaction analyzer of FIG. 2 to associate media impressions to transaction information.

FIG. 6 is a flow diagram representative of example machine readable instructions 600 which may be executed to implement the example audience measurement server 132 of FIG. 1 and/or the example impression-transaction analyzer 200 of FIG. 2 to associate media impressions to transaction information. The example instructions 600 of FIG. 6 will be described with reference to the example impression-transaction analyzer 200 of FIG. 2.

The example product checker 202 of FIG. 2 receives media impression information from mobile devices (e.g., the mobile device 106 of FIG. 1) (block 602). In the illustrated example, the received media impression information includes a device/user identifier such as the device/user identifier 124 of FIG. 1. Example types of the device/user identifier 124 received in the media impression information include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., an "Identifier for Advertising" (IDFA), advertising service identifiers, device usage analytics service identifiers, demographics collection service identifiers), web storage data, document object model (DOM) storage data, local shared objects (also referred to as "Flash cookies"), etc.

The example product checker 202 determines product information associated with the media impression information (block 604). For example, the product checker 202 may access (e.g., query) the product database 204 of FIG. 2 to determine an identifier of a product that is represented in a media impression at the mobile device 106 and which resulted in receiving the media impression information in block 602.

The example transaction requester 206 requests transaction information from a merchant database proprietor (e.g., the merchant database proprietor 146 of FIG. 1) based on the device/user identifier 124 (e.g., determined in block 602) and/or based on the product information (e.g., determined in block 604) (block 606). For example, the transaction requester 206 may generate a transaction request 152 of FIG. 1 including the device/user identifier 124 and/or the product information 154, and send the transaction request 152 to the merchant database proprietor 146.

The example transaction requester 206 receives transaction information 150 from the merchant database proprietor 146 (block 608). The transaction information 150 may include, for example, a unique transaction identifier, a device/user identifier 124, a product identifier, and/or a time/date at which the transaction occurred. Example transaction information 150 is shown in Table 2 above. If a transaction performed at the merchant database proprietor 146 involved multiple products, the example transaction requester 206 may receive multiple records, each representing one product involved in the transaction.

The example impression/transaction matcher 208 associates transactions involving a product with media impressions corresponding to the product (block 610). For example, the impression/transaction matcher 208 may match impression information (e.g., impression records such as those illustrated in Table 1 above) to transaction information (e.g., transaction records such as those illustrated in Table 2 above) by determining that a media impression corresponds to a same device/user identifier 124 as a transaction and that the media impression represents a product involved in the transaction. In some examples, the impression/transaction matcher 208 matches media impressions to transactions. For example, the impression/transaction matcher 208 may determine that an impression occurred prior to a transaction based on respective times/dates of the impression and the transaction. Example instructions that may be used to implement block 610 are described below with reference to FIG. 7.

When the appropriate media impressions and transactions have been associated (block 610), the example effectiveness calculator 214 of FIG. 2 determines a media effectiveness and/or a publisher effectiveness (block 612). For example, the effectiveness calculator 214 may determine whether media impressions delivered via a first publisher (e.g., the app publisher 110, the media publisher 120) result in a higher sales lift (e.g., a larger sales increase). Additionally or alternatively, the example effectiveness calculator 214 may determine a media effectiveness of the media corresponding to the impressions by calculating a sales lift from a first time period prior to beginning a media campaign to a second time period subsequent to beginning the media campaign to determine an effect of the media on sales of the represented product. The example instructions 600 of FIG. 6 end.

FIG. 7 is a flow diagram representative of example machine readable instructions 700 which may be executed to implement the example audience measurement server 132 of FIG. 1 and/or the example impression-transaction analyzer 200 of FIG. 2 to correlate transactions involving a product to media impressions corresponding to the product. In some examples, the example instructions 700 of FIG. 7 may be performed to implement block 610 of FIG. 6. The example instructions 700 of FIG. 7 will be described with reference to the example impression-transaction analyzer 200 of FIG. 2.

The example instructions 700 begin after block 608 of FIG. 6 (e.g., receiving transaction information). The example impression/transaction matcher 208 of FIG. 2 selects a media impression from the media impression information (block 702). For example, the impression/transaction matcher 208 may select a media impression record from the records of Table 1 above. In this example, the impression/transaction matcher 208 selects the first example record of Table 1 above (e.g., Impression ID 11).

The example impression/transaction matcher 208 determines a product represented by the media corresponding to the selected media impression (block 704). For example, the impression/transaction matcher 208 may determine the Product ID, from Table 1 above, that corresponds to the selected impression ID. In this example, the determined Product ID is R9ANT20EJY.

The example impression/transaction matcher 208 of FIG. 2 also determines a device/user identifier 124 corresponding to the selected media impression (block 706). For example, the impression/transaction matcher 208 may determine the Device/User ID, from Table 1 above, that corresponds to the selected impression ID. In this example, the determined Device/User ID is HOI35JGETR.

The example impression/transaction matcher 208 selects a transaction from the transaction information (block 708). For example, the impression/transaction matcher 208 may select a transaction record from the records of Table 2 above. In this example, the impression/transaction matcher 208 selects the first example record of Table 2 above (e.g., Transaction ID 21).

The example impression/transaction matcher 208 determines a product purchased in the transaction corresponding to the selected transaction (block 710). For example, the impression/transaction matcher 208 may determine the Product ID, from Table 2 above, that corresponds to the selected Transaction ID. In this example, the determined Product ID is R9ANT20EJY.

The example impression/transaction matcher 208 of FIG. 2 also determines a device/user identifier 124 corresponding to an account used to perform the selected transaction (block 712). For example, the impression/transaction matcher 208 may determine the Device/User ID, from Table 1 above, that corresponds to the selected Transaction ID. In this example, the determined Device/User ID is HOI35JGETR.

The example impression/transaction matcher 208 determines whether the selected media impression matches the selected transaction based on the respective products and the respective device/user identifiers (block 714). For example, the impression/transaction matcher 208 compares the Device/User ID of the selected impression (e.g., Device/User ID HOI35JGETR) to the Device/User ID of the selected transaction (e.g., Device/User ID HOI35JGETR) and compares the Product ID of the selected impression (e.g., Product ID R9ANT20EJY) to the Product ID of the selected transaction (e.g., Product ID R9ANT20EJY).

If the selected media impression matches the selected transaction (block 714), the example impression/transaction matcher 208 of FIG. 2 determines whether a time/date of the selected media impression occurred prior to the time/date of the selected transaction (block 716). For example, the impression/transaction matcher 208 compares the time/date of the selected impression (e.g., 2014-07-08:09:15:00) to the time/date of the selected transaction (block 2014-07-09:19: 12:00). If the time/date of the selected media impression occurred prior to the time/date of the selected transaction (block 716), the example impression/transaction matcher 208 associates the selected transaction to the selected media impression (block 718). By associating the selected transaction to the selected media impression (block 718), the example impression/transaction matcher 208 may infer that the media impression may have contributed or did actually contribute to the occurrence of the transaction (e.g., media corresponding to the media impression influenced a user to make the transaction).

If the time/date of the selected media impression does not occur prior to the time/date of the selected transaction (block 716), or if the selected media impression does not match the selected transaction (block 714), the example impression/transaction matcher 208 determines whether there are additional transactions to compare to the selected media impression (block 720). If there are additional transactions to compare to the selected media impression (block 720), control returns to block 708 to select another transaction (e.g., to select another transaction record from Table 2).

If there are no more transactions to compare to the selected media impression (block 720), or after associating the selected transaction to the selected media impression (block 718), the example impression/transaction matcher 208 determines whether there are additional media impressions (block 722). If there are additional media impressions (block 722), control returns to block 702 to select another media impression. When there are no more media impressions (block 722), the example instructions 700 of FIG. 7 end and control returns to a calling function or process such as the example instructions of FIG. 6.

Figure 8A:
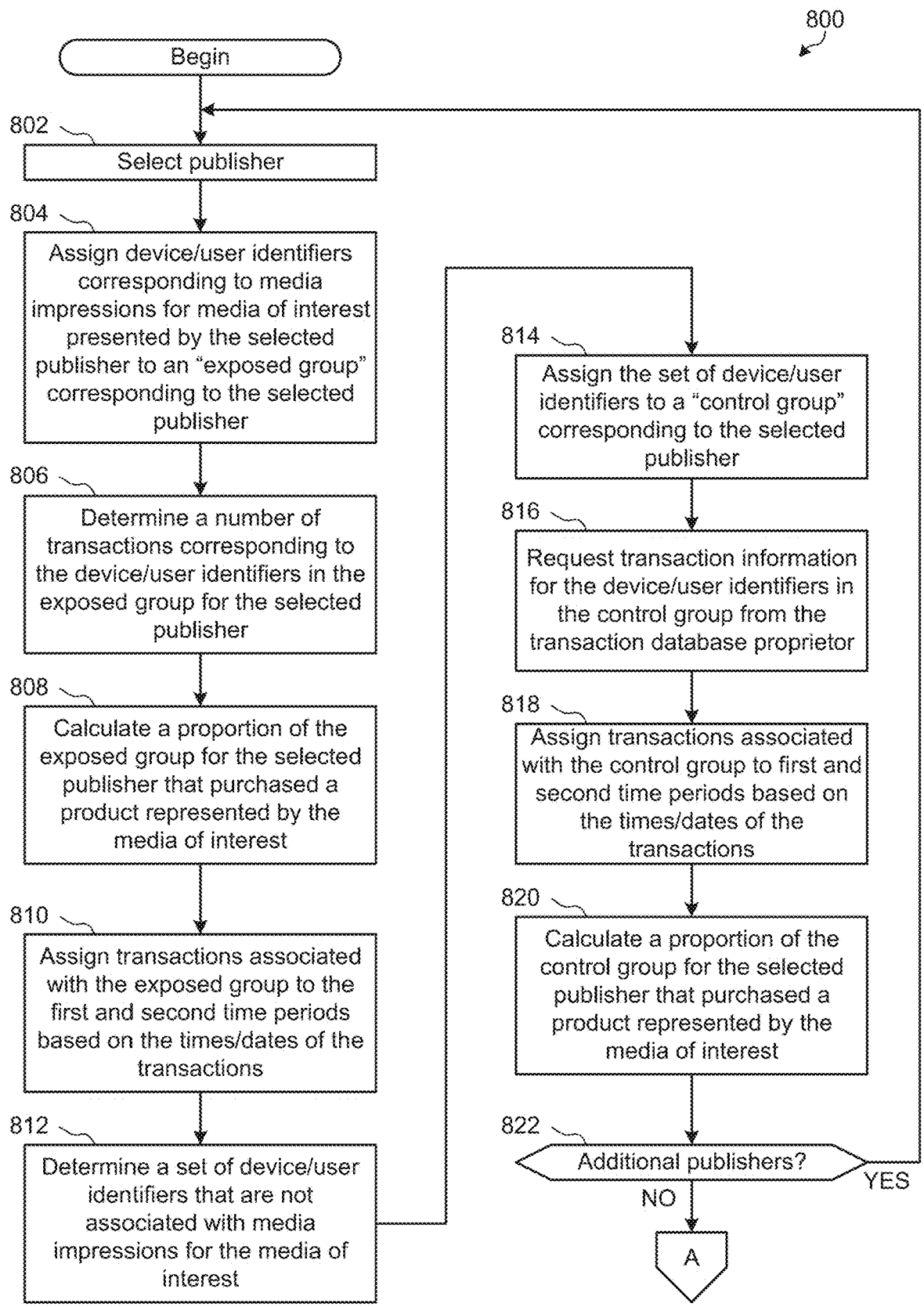
FIGS. 8A and 8B show a flow diagram representative of example machine readable instructions which may be executed to implement the example impression-transaction analyzer of FIG. 2 to determine media and publisher effectiveness.
Figure 8B:
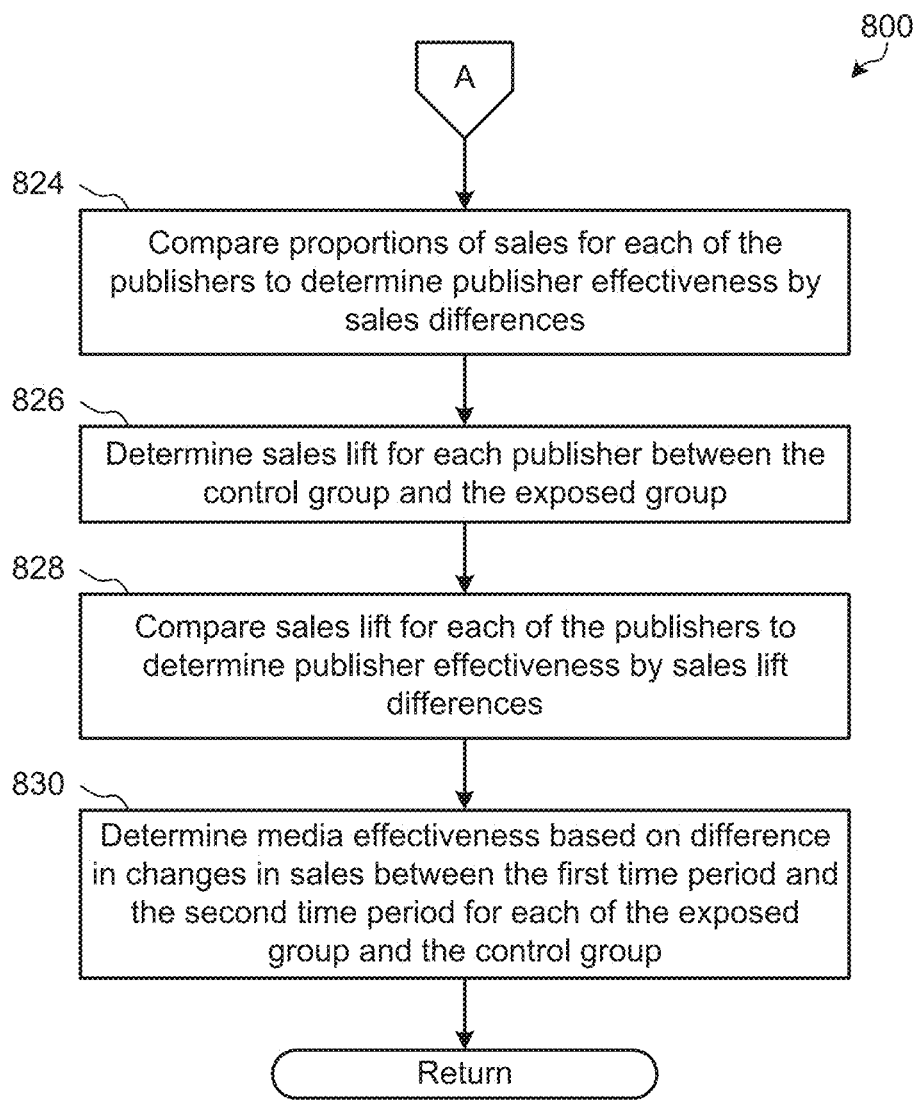

FIGS. 8A and 8B show a flow diagram representative of example machine readable instructions 800 which may be executed to implement the example audience measurement server 132 of FIG. 1 and/or the example impression-transaction analyzer 200 of FIG. 2 to determine media and publisher effectiveness. In some examples, the example instructions 800 of FIGS. 8A and 8B may be performed to implement block 612 of FIG. 6. The example instructions 800 of FIGS. 8A and 8B will be described with reference to the example impression-transaction analyzer 200 of FIG. 2.

The example group identifier 210 of FIG. 2 selects a publisher (block 802). For example, the group identifier 210 may select an app publisher (e.g., a publisher of the app 116 of FIG. 1, a publisher of the browser 117 of FIG. 1, etc.) and/or a media publisher (e.g., a publisher of media 118 presented on the mobile device 106 of FIG. 1 via the app 116 and/or via the browser 117).

The example group identifier 210 assigns device/user identifiers 124 that correspond to media impressions for media of interest and that are presented by the selected publisher to an "exposed group" that corresponds to the selected publisher (block 804). The exposed group for the selected publisher therefore includes device/user identifiers 124 of those mobile devices 106 from which impression data 130, specifying the media of interest and the selected publisher, has been received. For example, if the selected publisher is a publisher of the app 116, the exposed group for the selected publisher includes the device/user identifiers 124 for mobile devices 106 on which media impressions have occurred using the app 116 (e.g., according to the impression data 130 reporting the media impressions to the AME 108).

The example transaction aggregator 212 determines a number of transactions that correspond to the device/user identifiers 124 in the exposed group for the selected publisher (block 806). For example, the transaction aggregator 212 may determine a number of transactions that match the device/user identifiers 124. The identification of matching transactions may be performed prior to executing the instructions 800 (e.g., by the impression/transaction matcher 208), such as by executing block 610 of FIG. 6 and/or by executing the instructions 700 of FIG. 7.

The example transaction aggregator 212 calculates a proportion of the exposed group for the selected publisher that purchased the product represented in the media of interest (block 808). For example, the transaction aggregator 212 determines the number of the device/user identifiers 124 that were associated with a media impression that matched a transaction, as a percentage of the total number of device/user identifiers 124 in the exposed group. The example transaction aggregator 212 may calculate the proportion the first and/or second time periods, individually and/or together as a single time period.

The example transaction aggregator 212 of FIG. 2 assigns transactions associated with the exposed group for the selected publisher to first and second time periods, based on the times/dates of the transactions (block 810). The example first and second time periods may be used to divide transactions into 1) transactions occurring prior to media impressions corresponding to the media of interest (e.g., prior to a media campaign in which the media is to be delivered to mobile devices to cause media impressions) and, therefore, not having any effect on sales of the product represented in the media and 2) transactions occurring after media impressions corresponding to the media of interest have begun (e.g., subsequent to the initiation of the media campaign, such as during and/or after the media campaign) and, therefore, potentially having an effect on sales of the product.

The example group identifier 210 determines a set of device/user identifiers 124 that are not associated with media impressions for the media of interest (block 812). For example, the group identifier 210 may use device/user identifiers 124 associated with media impressions for media other than the media of interest, where the impression-transaction analyzer 200 has not received impression data 130 indicating an impression of the media of interest occurring in association with the device/user identifier 124. In some examples, the group identifier 210 may use device/user identifiers 124 and/or impression data 130 from other media campaigns (e.g., media campaigns not associated with the media of interest, in which other media is presented at the mobile devices) and verify that the device/user identifiers 124 have not had a media impression of the media of interest.

The example group identifier 210 assigns the set of device/user identifiers 124 to a "control group" corresponding to the selected publisher (block 814). The control group represents device/user identifiers 124 and/or mobile devices 106 that have not been exposed to the media of interest.

The example transaction requester 206 requests transaction information for the device/user identifiers in the control group from the merchant database proprietor 146 (block 816). For example, the transaction requester 206 may send one or more transaction requests 152 including the device/user identifiers 124 in the control group and product information 154 for a product represented in the media of interest (e.g., the same product used in block 808).

The example transaction aggregator 212 of FIG. 2 assigns transactions associated with the control group for the selected publisher to first and second time periods, based on the times/dates of the transactions (block 818). The example first and second time periods may be used to divide transactions into the first and second time periods described above with reference to block 810 (e.g., to facilitate comparison of control group and the exposed group during the same time periods).

Based on transaction information 150 received from the merchant database proprietor 146 (e.g., in response to the request of block 814), the example transaction aggregator 212 of FIG. 2 calculates a proportion of the control group for the selected publisher that purchased the product represented in the media of interest (block 820). For example, the transaction aggregator 212 determines a number of the device/user identifiers 124 in the control group for which transactions including the product were received from the merchant database proprietor 146 in response to the request of block 816. The example transaction aggregator 212 may calculate the proportion for the first and/or second time periods, individually and/or together as a single time period.

The example group identifier 210 determines whether there are any additional publishers (block 822). If there are additional publishers (block 822), control returns to block 802 to select another publisher.

When there are no more publishers, control is passed to block 824 of FIG. 8B, where the example effectiveness calculator 214 of FIG. 2 compares proportions of sales for each of the publishers to determine a publisher effectiveness by sales differences. Using the table 300 and the example publishers 302, 304 described above with reference to FIG. 3, the example effectiveness calculator 214 may compare the exposed group sales 312 of Publisher A 302 (e.g., 22,100 sales from 35,400 device/user identifiers, or 62.4% of the exposed group) to exposed group sales 312 of Publisher B 304 (e.g., 10,600 sales from 30,100 device/user identifiers, or 35.2% of the exposed group).

The example effectiveness calculator 214 of FIG. 2 determines a sales lift, for each of the example publishers, between the control group and the exposed group and between the first time period and the second time period (block 826). For example, using the example of FIG. 3 described above, the sales lift 314 for Publisher A 302 is the increase in the sales proportion between the control group (e.g., 34.4%) and the exposed group (e.g., 62.4%), or 81.3% (e.g., the percentage of sales in the exposed group for publisher A 302 divided by the percentage of sales in the control group for publisher A 302 (62.4%/34.4%)). Similarly, the sales lift 314 for Publisher B 304 is the increase in the sales proportion between the control group (e.g., 32%) and the exposed group (e.g., 35.2%), or 10% (e.g., the percentage of sales in the exposed group for publisher B 304 divided by the percentage of sales in the control group for publisher B 304 (35.2%/32%)).

The example effectiveness calculator 214 compares the sales lift for each of the example publishers 302, 304 to determine a publisher effectiveness by the sales lift difference (block 828). For example, the effectiveness calculator 214 compares the sales lift 314 of the Publisher A 302 (e.g., 81.3%) to the sales lift 314 of the Publisher B 304 (e.g., 10%). In this example, the effectiveness calculator 214 may determine that Publisher A 302 is more effective than Publisher B 304 for the media of interest. Publisher A 302 may be more effective than Publisher B 304 because, for example, Publisher A 302 may reach an audience that is more likely to be influenced by the media of interest.

The example effectiveness calculator 214 determines a media effectiveness for the media of interest based on a difference in the changes in sales between the first time period and the second time period for each of the control group and the exposed group (block 830). For example, the effectiveness calculator 214 may compare A) the change in sales for the control group between the first time period (e.g., 10% of the device/user identifiers in the control group purchased the product of interest during the first time period) and the second time period (e.g., 12% of the device/user identifiers in the control group purchased the product of interest during the second time period) to B) the change in sales for the exposed group between the first time period (e.g., 16% of the device/user identifiers in the exposed group purchased the product of interest during the first time period) and the second time period (e.g., 46% of the device/user identifiers in the exposed group purchased the product of interest during the second time period). By comparing the changes in sales across the time periods between the groups, the example effectiveness calculator 214 controls for extraneous influences (e.g., non-mobile device media impressions for the same product) to more accurately capture the effect of the media of interest.

The example instructions 800 of FIGS. 8A and 8B then end and, for example, control returns to a calling function or process such as the example instructions of FIG. 6.

Figure 9:
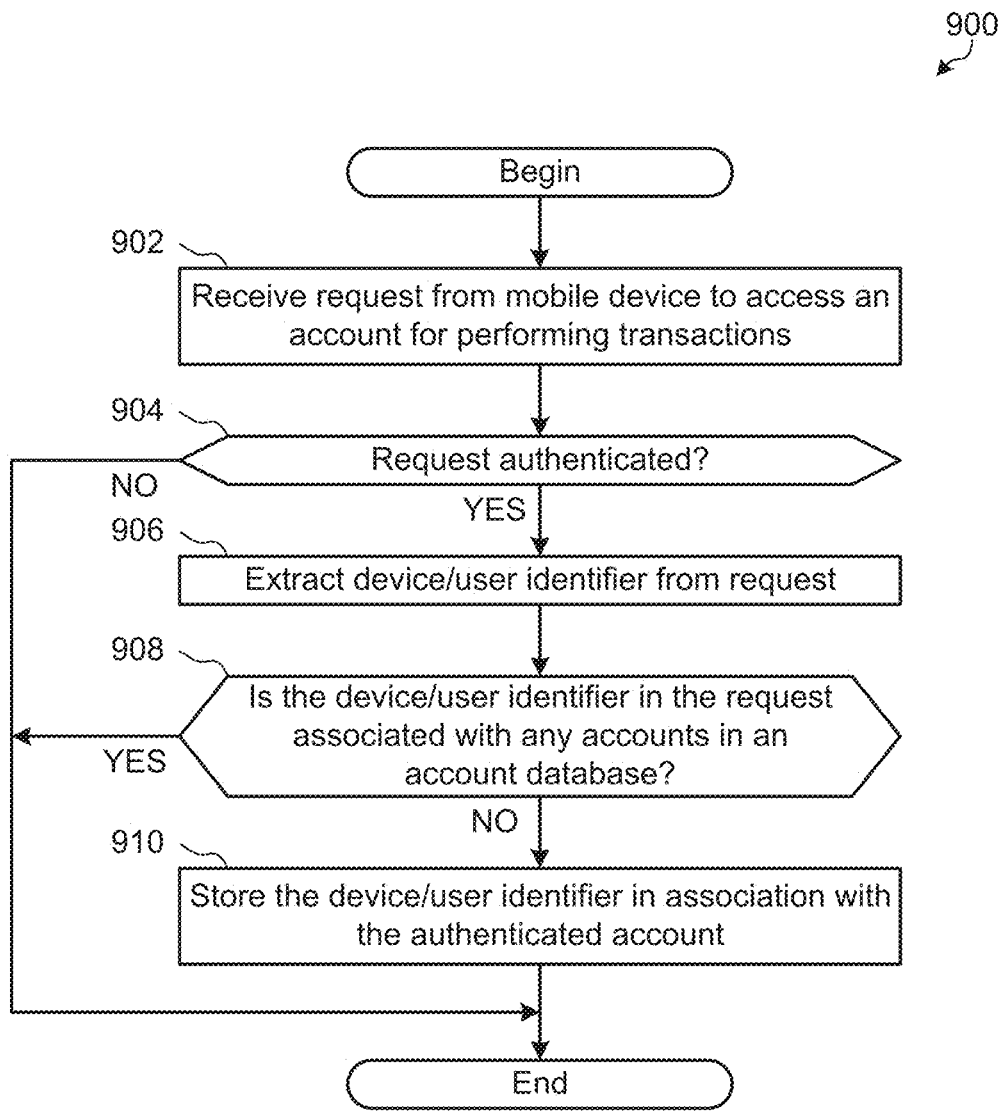
FIG. 9 is a flow diagram representative of example machine readable instructions which may be executed to implement the example transaction information provider of FIG. 5 to associate device/user identifiers to merchant database proprietor accounts.

FIG. 9 is a flow diagram representative of example machine readable instructions 900 which may be executed to implement the example merchant database proprietor 146 of FIG. 1 and/or the example transaction information provider 500 of FIG. 5 to associate device/user identifiers to merchant database proprietor accounts. The example instructions 900 are described with reference to the example transaction information provider 500 of FIG. 5.

The example user authenticator 502 of FIG. 5 receives a request from a mobile device (e.g., merchant account information 148 from the mobile device 106 of FIG. 1, the app 116 of FIG. 1) to access an account at the merchant database proprietor for performing a transaction (block 902). For example, the transaction information provider 500 may enable authenticated users to view and/or purchase products from the transaction information provider 500 and/or through the systems of the transaction information provider 500.

The example user authenticator 502 determines whether the request is authenticated (block 904). For example, the user authenticator 502 may use any past, present, or future authentication techniques to authenticate the merchant account information 148 included in the request.

If the request is authenticated (block 904), the example account-identifier correlator 504 of FIG. 5 extracts a device/user identifier (e.g., the device/user identifier 124 of FIG. 1) from the request (block 906). Example types of a device/user identifier 124 that may be extracted include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., an "Identifier for Advertising" (IDFA), advertising service identifiers, device usage analytics service identifiers, demographics collection service identifiers), web storage data, document object model (DOM) storage data, local shared objects (also referred to as "Flash cookies"), etc. In some examples, the transaction information provider 500 agrees with the AME 108 ahead of time on a same type of device/user identifier 124 that is accessible to both entities.

The example account-identifier correlator 504 determines whether the extracted device/user identifier 124 is stored in association with any accounts in the user account database 512 of FIG. 5 (block 908). For example, the user account database 512 stores associations of device/user identifiers 124 and user accounts.

When the extracted device/user identifier 124 is not yet stored in association with any accounts in the user account database 512 of FIG. 5 (block 908), the example account-identifier correlator 504 stores the extracted device/user identifier 124 in association with the authenticated account (block 910). For example, the account-identifier correlator 504 stores the extracted device/user identifier 124 in the user account database 512 and indicates that the extracted device/user identifier 124 corresponds to the user account.

After storing the device/user identifier 124 (block 910), if the extracted device/user identifier 124 is associated with an accounts in the user account database 512 of FIG. 5 (block 908), or if the request to access the account is not authenticated (block 904), the example instructions 900 of FIG. 9 end.

Figure 10:
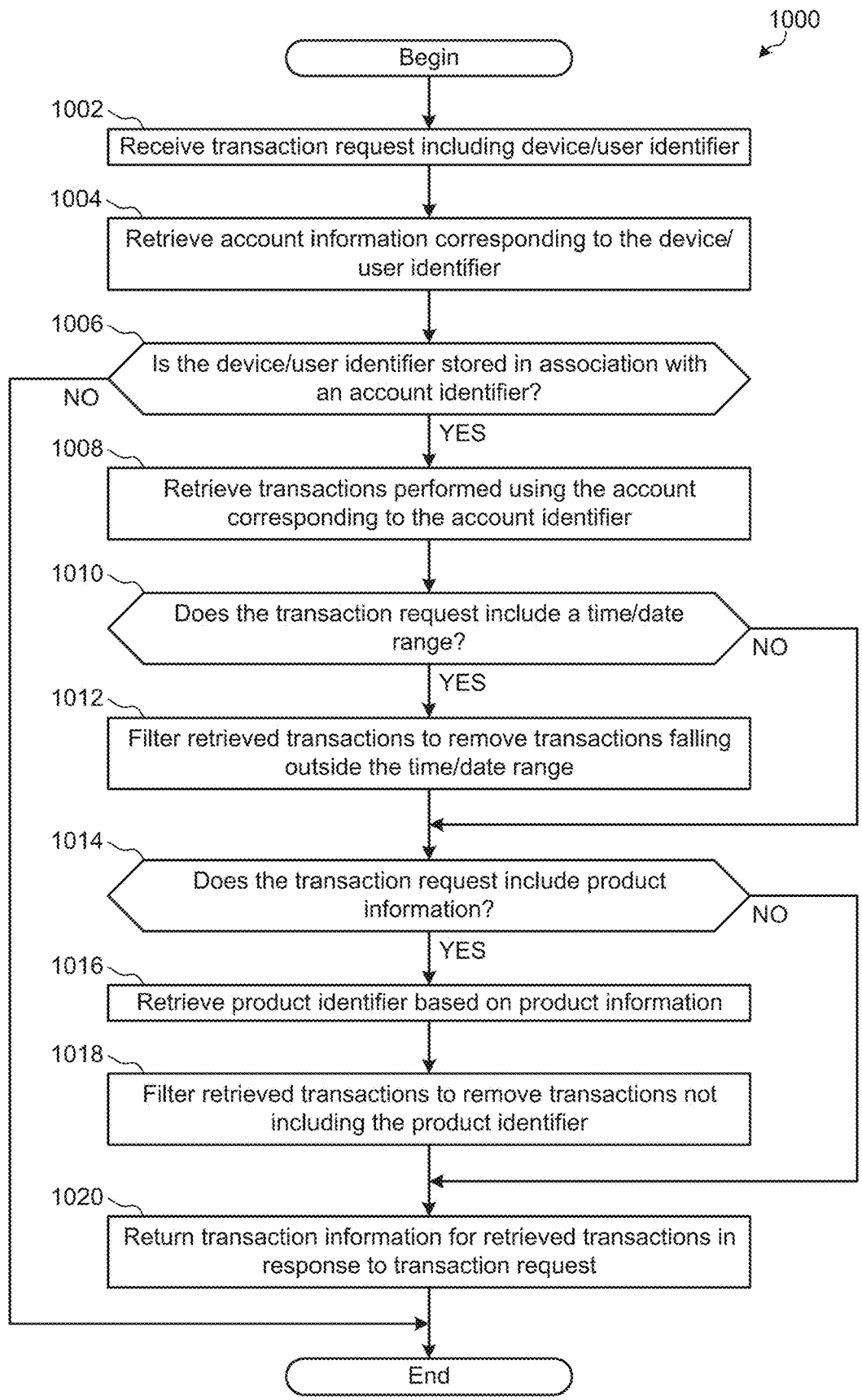
FIG. 10 is a flow diagram representative of example machine readable instructions which may be executed to implement the example transaction information provider of FIG. 5 to provide transaction information.

FIG. 10 is a flow diagram representative of example machine readable instructions 1000 which may be executed to implement the example merchant database proprietor 146 of FIG. 1 and/or the example transaction information provider 500 of FIG. 5 to provide transaction information. The example instructions 1000 are described with reference to the example transaction information provider 500 of FIG. 5.

The example transaction query generator 508 of FIG. 5 receives a transaction request including a device/user identifier 124 (block 1002). For example, the transaction query generator 508 may receive a transaction request 152 from the AME 108 of FIG. 1.

The example transaction query generator 508 retrieves account information corresponding to the device/user identifier 124 in the request 152 (block 1004). For example, the transaction query generator 508 may query the user account database 512 of FIG. 5 using the device/user identifier 124, and the user account database 512 determines whether the device/user identifier 124 corresponds to a user account stored in the user account database 512.

The example transaction query generator 508 determines whether the device/user identifier 124 is associated with an account identifier (block 1006). For example, the device/user identifier 124 may have been previously stored in association with an account identifier in the user account database 512 using the example instructions 900 of FIG. 9.

When the device/user identifier 124 is associated with an account identifier (block 1006), the example transaction query generator 508 of FIG. 5 retrieves transactions performed using the account corresponding to the account identifier (e.g., the account identifier determined in block 1006) (block 1008). For example, the transaction query generator 508 may query the transaction database 516 of FIG. 5 using the account identifier to determine the transactions performed using the account identifier. The transaction database 516 provides transaction information for each retrieved transaction, such as a device/user identifier, a transaction identifier, products purchased in the transaction, and a time/date the transaction occurred.

The example transaction query generator 508 determines whether the transaction request 152 includes a time/date range (block 1010). For example, the transaction request 152 may specify a time/date range of interest (e.g., a time/date prior to which transactions are not desired). The time/date range may be closed or open-ended. If the transaction request includes a time/date range (block 1010), the example transaction query generator 508 filters the retrieved transactions (e.g., the transactions from block 1008) to remove transactions falling outside the time/date range specified in the transaction request 152.

After filtering the retrieved transactions (block 1012), or if the transaction request 152 does not include a time/date range (block 1010), the example transaction query generator 508 determines whether the transaction request 152 includes product information (e.g., the product information 154 of FIG. 1) (block 1014). Example product information 154 specifies a product of interest to the AME 108 (e.g., a product that is represented in media corresponding to a media impression at a mobile device 106).

If the transaction request includes product information 154 (block 1014), the example transaction query generator 508 retrieves a product identifier based on the product information 154 (block 1016). For example, the transaction query generator 508 may query the product database 514 of FIG. 5 to determine a product identifier that corresponds to the product information 154 specified by the AME 108 in the request 152. The example transaction query generator 508 filters the retrieved transactions to remove transactions that do not include the product identifier (block 1018).

After filtering the retrieved transactions (block 1018), or if the transaction request 152 does not include product information 154 (block 1014), the example transaction reporter 510 returns the transaction information 150 (e.g., the transaction information remaining after filtering in block 1012 and/or block 1018) to the AME 108 in response to the transaction request 152 (block 1020). For example, the transaction reporter 510 may send one or more transaction records (e.g., the example records illustrated in Table 2 above), including a Transaction ID, a Product ID, a Device/User ID, and/or a Time/Date, to the example AME 108 as a response to the transaction request 152.

After returning the transaction information (block 1020), or if the device/user identifier 124 is not associated with an account identifier (block 1006), the example instructions 1000 of FIG. 10 end.

Figure 11:
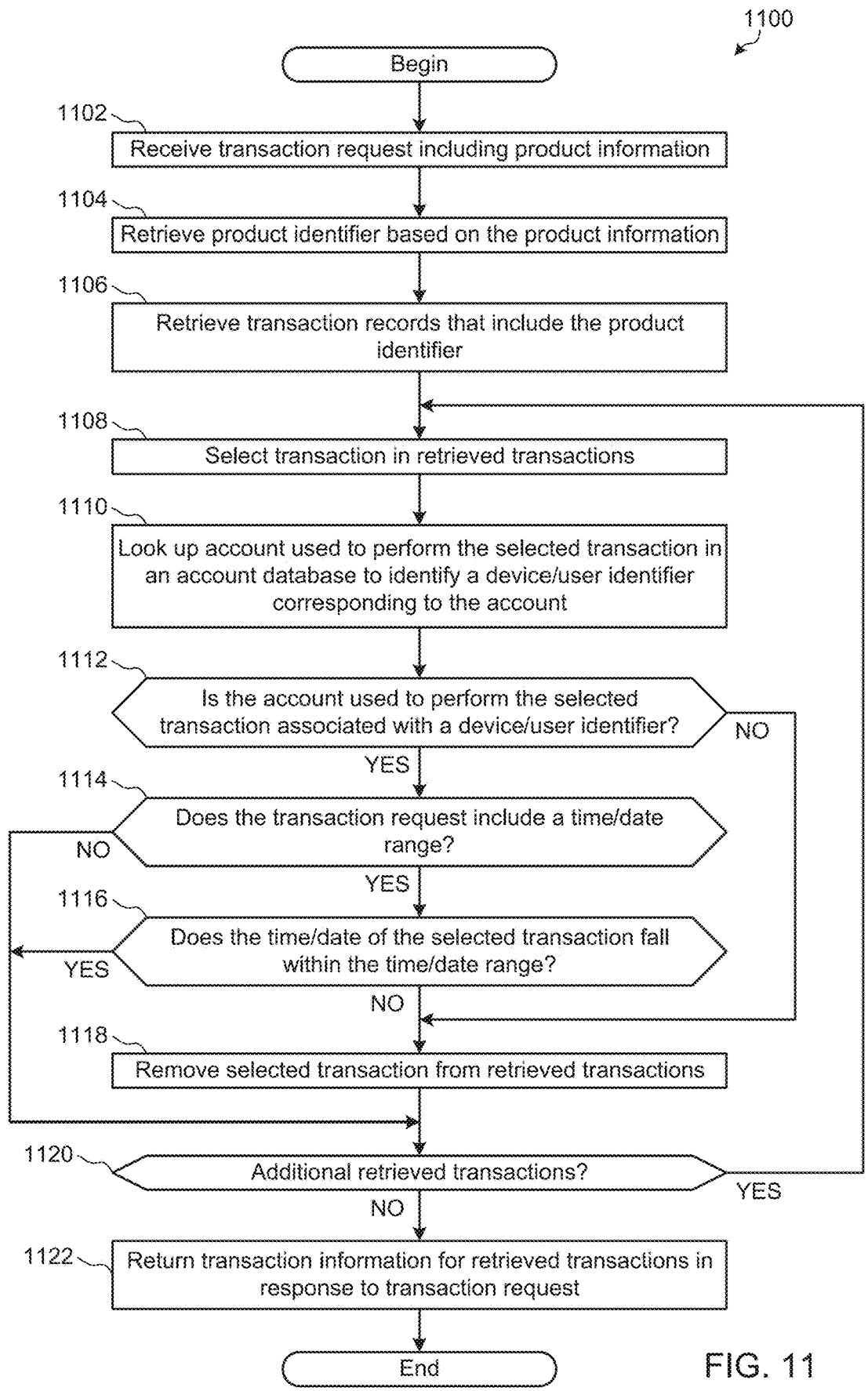
FIG. 11 is a flow diagram representative of example machine readable instructions which may be executed to implement the example transaction information provider of FIG. 5 to provide transaction information.

FIG. 11 is a flow diagram representative of example machine readable instructions 1100 which may be executed to implement the example merchant database proprietor 146 of FIG. 1 and/or the example transaction information provider 500 of FIG. 5 to provide transaction information. In contrast to the example instructions 1000 of FIG. 10 described above, the instructions 1100 of FIG. 11 may be executed when, for example, a transaction request 152 from the AME 108 of FIG. 1 does not include a device/user identifier 124. The example instructions 1100 are described with reference to the example transaction information provider 500 of FIG. 5.

The example transaction query generator 508 of FIG. 5 receives a transaction request (e.g., a transaction request 152 from the AME 108) that includes product information (e.g., the product information 154 of FIG. 1) (block 1102).

The example transaction query generator 508 retrieves a product identifier based on the product information 154 (block 1104). For example, the transaction query generator 508 may query the product database 514 of FIG. 5 to determine a product identifier that corresponds to the product information 154 specified by the AME 108 in the request 152.

The example transaction query generator 508 of FIG. 5 retrieves transaction records that include the product identifier (e.g., the product retrieved in block 1104) (block 1106). For example, the transaction query generator 508 may query the transaction database 516 of FIG. 5 using the product identifier to determine all of the performed transactions involving the product corresponding to the product identifier. In response to the query, the transaction database 516 provides transaction information for each identified transaction, such as a device/user identifier, a transaction identifier, products purchased in the transaction, and a time/date the transaction occurred.

The example transaction query generator 508 selects a transaction from the retrieved transactions (block 1108). The example transaction query generator 508 looks up an account used to perform the selected transaction in an account database to identify a device/user identifier 124 corresponding to the account (block 1110). For example, the transaction query generator 508 may look up an account specified in the selected transaction record, which is used to query the user account database 512 to determine whether any device/user identifiers correspond to the account.

The transaction query generator 508 determines whether the account used to perform the selected transaction is associated with a device/user identifier 124 (block 1112). If the account used to perform the selected transaction is associated with a device/user identifier 124 (block 1112), the example transaction query generator 508 determines whether the transaction request 152 includes a time/date range (block 1114). For example, the transaction request 152 may specify a time/date range of interest (e.g., a time/date prior to which transactions are not desired). The time/date range may be closed or open-ended.

If the transaction request 152 includes a time/date range (block 1114), the example transaction query generator 508 determines whether the time/date of the selected transaction falls within the time/date range (block 1116). If the time/date of the selected transaction does not fall within the time/date range (block 1116), or if the account used to perform the selected transaction is not associated with a device/user identifier 124 (block 1112), the example transaction query generator 508 removes the selected transaction from the retrieved transactions (e.g., the transactions from block 1106).

After removing the selected transaction (block 1118), or if 1) the account used to perform the selected transaction is associated with a device/user identifier 124 (block 1112) and 2) either A) the time/date of the selected transaction falls within the time/date range (block 1116) or B) the transaction request 152 does not include a time/date range (block 1114), the example transaction query generator 508 determines whether there are additional retrieved transactions (block 1120). If there are additional retrieved transactions (block 1120), control returns to block 1108 to select another transaction.

When there are no more retrieved transactions (block 1120), the example transaction reporter 510 returns the transaction information 150 (e.g., the transaction information remaining after filtering in blocks 1110-1118) to the example AME 108 in response to the transaction request 152 (block 1122). For example, the transaction reporter 510 may return one or more transaction records (e.g., the example records illustrated in Table 2 above), including a Transaction ID, a Product ID, a Device/User ID, and/or a Time/Date, to the AME 108. The example instructions 1100 of FIG. 11 then end.

Figure 12:
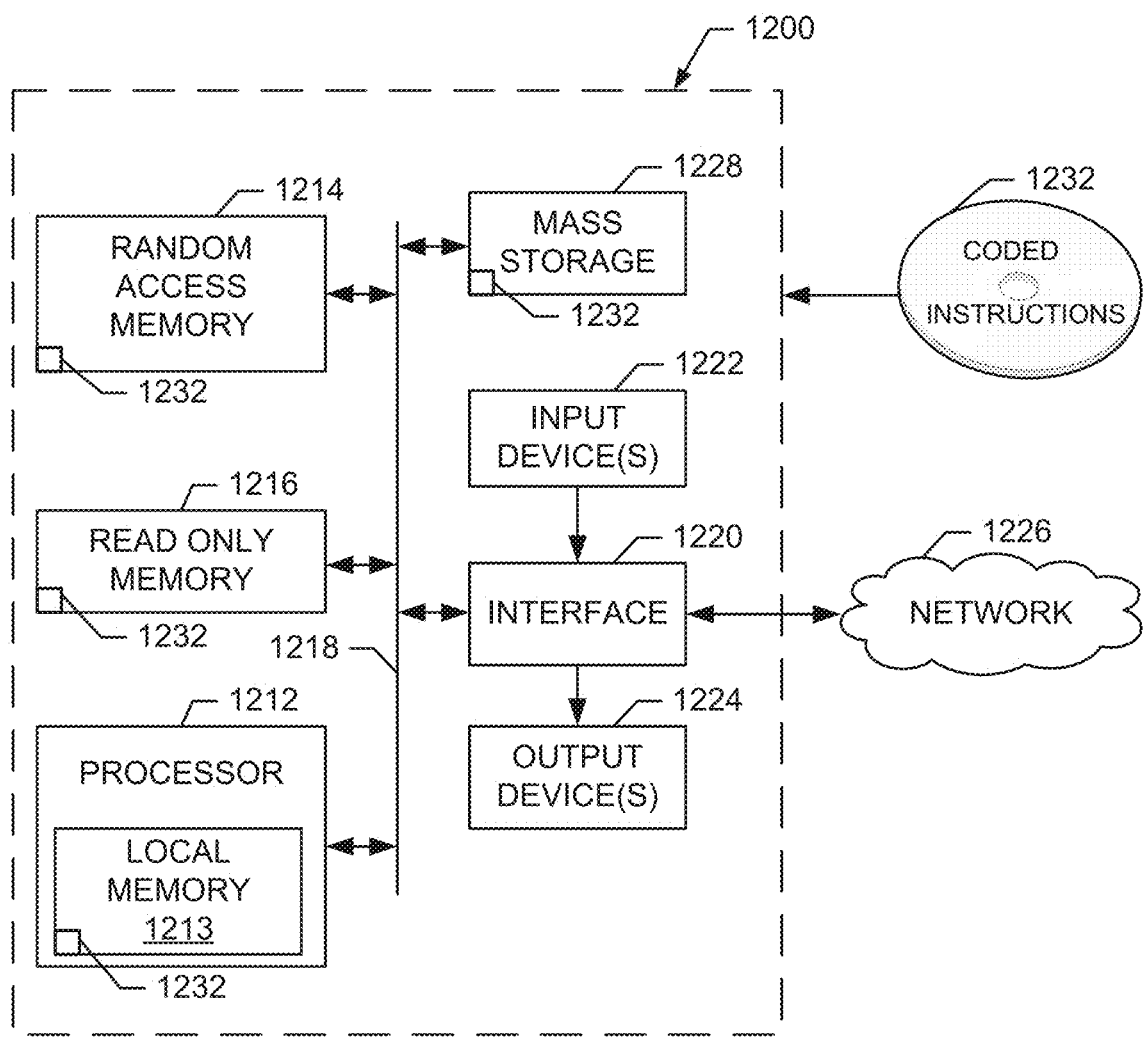
FIG. 12 is an example processor platform that may be used to execute the example instructions of FIGS. 6-11 to implement example apparatus and systems disclosed herein.

FIG. 12 is a block diagram of an example processor platform 1200 capable of executing the instructions of FIGS. 6, 7, 8, 9, 10, and/or 11 to implement the example product checker 202, the example product database 204, the example transaction requester 206, the example impression/transaction matcher 208, the example group identifier 210, the example transaction aggregator 212, the example effectiveness calculator 214, the example user authenticator 502, the example account-identifier correlator 504, the example transaction engine 506, the example transaction query generator 508, the example transaction reporter 510, the example user account database 512, the example product database 514, the example transaction database 516 and/or, more generally, the example audience measurement entity 108, the example audience measurement server 132, and/or the example merchant database proprietor 146 of FIG. 1, the example impression-transaction analyzer 200 of FIG. 2, and/or the example transaction information provider 500 of FIG. 5. The processor platform 1200 can be, for example, a server, a personal computer, a mobile device (e.g., a cell phone, a smart phone, a tablet such as an iPad™ tablet), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device (s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 to implement the example machine readable instructions of FIGS. 6, 7, 8, 9, 10, and/or 11 may be stored in the mass storage device 1228, in the volatile memory 1214, in the non-volatile memory 1216, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions in the apparatus; and
   processor circuitry to execute the instructions to:
      store records at a first server of an audience measurement entity based on first identifiers received at the first server via first network communications from first computing devices, the first identifiers located in the first network communications by the first computing devices in response to media accessed via the first computing devices, and the records to represent media impressions corresponding to the accesses of the media via the first computing devices;
      query a product database based on media identifiers of the media impressions to access product identifiers of products or services appearing in the media accessed via the first computing devices, the product database to store the media identifiers in association with the product identifiers corresponding to the products or the services;
      cause transmission of second network communications to a second server of a database proprietor to request commercial transaction information from the product database, the second network communications including the product identifiers;
      receive third network communications from the second server of the database proprietor, the third network communications including the commercial transaction information corresponding to the product identifiers, the commercial transaction information including second identifiers associated with commercial transactions conducted using accounts accessed by the first computing devices;
      based on the processor circuitry determining that ones of the first identifiers match ones of the second identifiers and that times and dates of ones of the media impressions corresponding to the ones of the first identifiers are prior to times and dates of ones of the commercial transactions, credit ones of the media impressions corresponding to the ones of the first identifiers as contributing to occurrences of corresponding ones of the commercial transactions;
      group third identifiers in a control set, the third identifiers being associated with second computing devices that did not access the media;
      group the ones of the first identifiers in an exposed set, the ones of the first identifiers and the third identifiers recognizable by a merchant of the products or the services;
      determine a sales difference between first sales corresponding to the ones of the first identifiers and second sales corresponding to the second identifiers; and
      calculate a media effectiveness metric based on the sales difference.

2. The apparatus as defined in claim 1, wherein the instructions are to cause the processor circuitry to credit the ones of the media impressions as contributing to the occurrences of the commercial transactions by determining that the commercial transactions are associated with the products or the services.

3. The apparatus as defined in claim 1, wherein the instructions are to cause the processor circuitry to identify the products or the services corresponding to the media impressions.

4. The apparatus as defined in claim 3, wherein the media includes at least one of: (a) advertisements for the products or the services, or (b) media content including an intentional placement of the products or the services in the media content.

5. The apparatus as defined in claim 1, wherein the instructions are to cause the processor circuitry to:
   identify a first portion of the first identifiers via a first publisher and identify a second portion of the first identifiers via a second publisher, the first portion of the first identifiers and the second portion of the first identifiers recognizable by the merchant of the products or the services;
   determine a first sales lift based on third sales corresponding to the first portion of the first identifiers;
   determine a second sales lift based on fourth sales corresponding to the second portion of the first identifiers;
   determine a sales lift difference between the first sales lift and the second sales lift; and
   calculate a publisher effectiveness metric for at least one of the first publisher or the second publisher based on the sales lift difference.

6. A non-transitory computer readable storage medium comprising computer readable instructions which, when executed, cause logic circuitry to at least:
   store records at a first server of an audience measurement entity based on first identifiers received at the first server via first network communications from first computing devices, the first identifiers located in the first network communications by the first computing devices in response to media accessed via the first computing devices, and the records to represent media impressions corresponding to the accesses of the media via the first computing devices;
   query a product database based on media identifiers of the media impressions to access product identifiers of products or services appearing in the media accessed via the first computing devices, the product database to store the media identifiers in association with the product identifiers corresponding to the products or the services;

cause transmission of second network communications to a second server of a database proprietor to request commercial transaction information from the product database, the second network communications including the product identifiers;

receive third network communications from the second server of the database proprietor, the third network communications including the commercial transaction information corresponding to the product identifiers, the commercial transaction information including second identifiers associated with commercial transactions conducted using accounts accessed by the first computing devices;

based on the logic circuitry determining that ones of the first identifiers match ones of the second identifiers and that times and dates of ones of the media impressions corresponding to the ones of the first identifiers are prior to times and dates of ones of the commercial transactions, credit ones of the media impressions corresponding to the ones of the first identifiers as contributing to occurrences of corresponding ones of the commercial transactions;

group third identifiers in a control set, the third identifiers being associated with second computing devices that did not access the media;

group the ones of the first identifiers in an exposed set, the ones of the first identifiers and the third identifiers recognizable by a merchant of the products or the services;

determine a sales difference between first sales corresponding to the ones of the first identifiers and second sales corresponding to the second identifiers; and calculate a media effectiveness metric based on the sales difference.

7. The storage medium as defined in claim 6, wherein the first identifiers include at least one of unique identifiers of the first computing devices or user identifiers of users associated with the accounts.

8. The storage medium as defined in claim 6, wherein the instructions are to cause the logic circuitry to identify the products or the services represented in the media corresponding to the media impressions.

9. The storage medium as defined in claim 6, wherein the instructions are to cause the logic circuitry to credit the ones of the media impressions as contributing to the occurrences of the commercial transactions by:
determining that the commercial transactions involved the products or the services represented in the media corresponding to the media impressions.

10. The storage medium as defined in claim 6, wherein the commercial transaction information includes the product identifiers of the products or the services purchased in the commercial transactions and dates of the commercial transactions.

11. The storage medium as defined in claim 6, wherein the instructions are to cause the logic circuitry to calculate a publisher effectiveness metric by:
identifying a first portion of the first identifiers via a first publisher and identifying a second portion of the first identifiers via a second publisher, the first portion of the first identifiers and the second portion of the first identifiers recognizable by the merchant of the products or the services;
determining a first sales lift for the first publisher based on third sales corresponding to the first portion of the first identifiers;
determining a second sales lift for the second publisher based on fourth sales corresponding to the second portion of the first identifiers;
determining a sales lift difference between the first sales lift and the second sales lift; and
calculating a publisher effectiveness metric for at least one of the first publisher or the second publisher based on the sales lift difference.

12. A computer-implemented method comprising:
storing, by executing an instruction with a processor, records at a first server of an audience measurement entity based on first identifiers received at the first server via first network communications from first computing devices, the first identifiers located in the first network communications by the first computing devices in response to media accessed via the first computing devices, and the records to represent media impressions corresponding to the accesses of the media via the first computing devices;

querying, by executing an instruction with a processor, a product database based on media identifiers of the media impressions to access product identifiers of products or services appearing in the media accessed via the first computing devices, the product database to store the media identifiers in association with the product identifiers corresponding to the products or the services;

transmitting second network communications to a second server of a database proprietor to request commercial transaction information from the product database, the second network communications including the product identifiers;

receiving third network communications from the second server of the database proprietor, the third network communications including the commercial transaction information corresponding to the product identifiers, the commercial transaction information including second identifiers associated with commercial transactions conducted using accounts accessed by the first computing devices;

based on the processor determining that ones of the first identifiers match ones of the second identifiers and that times and dates of ones of the media impressions corresponding to the ones of the first identifiers are prior to times and dates of ones of the commercial transactions, crediting, by executing an instruction with the processor, ones of the media impressions corresponding to the ones of the first identifiers as contributing to occurrences of corresponding ones of the commercial transactions;

grouping, by executing an instruction with the processor, third identifiers in a control set, the third identifiers being associated with second computing devices that did not access the media;

grouping, by executing an instruction with the processor, the ones of the first identifiers in an exposed set, the ones of the first identifiers and the third identifiers recognizable by a merchant of the products or the services;

determining, by executing an instruction with the processor, a sales difference between first sales corresponding to the ones of the first identifiers and second sales corresponding to the second identifiers; and calculating, by executing an instruction with the processor, a media effectiveness metric based on the sales difference.

13. The method as defined in claim 12, wherein the first identifiers include at least one of unique identifiers of the first computing devices or user identifiers of users associated with the accounts.

14. The method as defined in claim 12, further including identifying the products or the services represented in the media corresponding to the media impressions.

15. The method as defined in claim 14, wherein the media includes at least one of: (a) advertisements for the products or the services, or (b) media content including an intentional placement of the products or the services in the media content.

16. The method as defined in claim 12, wherein the crediting of the ones of the media impressions as contributing to the occurrences of the commercial transactions includes:
    determining that the commercial transactions involved the products or the services represented in the media corresponding to the media impressions.

17. The method as defined in claim 12, wherein the commercial transaction information includes the product identifiers of the products or the services purchased in the commercial transactions and the dates of the commercial transactions.

18. The method as defined in claim 12, further including calculating a publisher effectiveness metric by:
    identifying a first portion of the first identifiers via a first publisher and identifying a second portion of the first identifiers via a second publisher, the first portion of the first identifiers and the second portion of the first identifiers recognizable by the merchant of the products or the services;
    determining a first sales lift for the first publisher based on third sales corresponding to the first portion of the first identifiers;
    determining a second sales lift for the second publisher based on fourth sales corresponding to the second portion of the first identifiers;
    determining a sales lift difference between the first sales lift and the second sales lift; and
    calculating the publisher effectiveness metric for at least one of the first publisher or the second publisher based on the sales lift difference.

19. The method as defined in claim 12, wherein the commercial transaction information is received from a proprietor of an application executed on the first computing devices.

* * * * *